United States Patent
Yu et al.

(10) Patent No.: US 12,192,012 B2
(45) Date of Patent: Jan. 7, 2025

(54) HARQ PROCESS CONTROL METHOD AND APPARATUS

(71) Applicant: HUAWEI TECHNOLOGIES CO., LTD., Shenzhen (CN)

(72) Inventors: Chang Yu, Shenzhen (CN); Junren Chang, Beijing (CN); Jun Wang, Shanghai (CN); Dongdong Wei, Shanghai (CN); Nannan Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 322 days.

(21) Appl. No.: 17/710,022

(22) Filed: Mar. 31, 2022

(65) Prior Publication Data
US 2022/0224454 A1 Jul. 14, 2022

Related U.S. Application Data

(63) Continuation of application No. PCT/CN2019/109783, filed on Oct. 1, 2019.

(51) Int. Cl.
*H04L 1/1829* (2023.01)
*H04L 1/1812* (2023.01)
*H04W 72/20* (2023.01)

(52) U.S. Cl.
CPC .......... *H04L 1/1854* (2013.01); *H04L 1/1812* (2013.01); *H04L 1/1861* (2013.01); *H04W 72/20* (2023.01)

(58) Field of Classification Search
CPC ... H04L 1/1854; H04L 1/1812; H04L 1/1861; H04L 1/1803; H04L 1/1835;
(Continued)

(56) References Cited

U.S. PATENT DOCUMENTS

2019/0044667 A1 2/2019 Guo et al.
2019/0068334 A1* 2/2019 Stern-Berkowitz ........................
H04L 1/1845
(Continued)

FOREIGN PATENT DOCUMENTS

| CN | 101009537 A | 8/2007 |
|---|---|---|
| CN | 102025692 A | 4/2011 |
| WO | 2018172862 A1 | 9/2018 |

OTHER PUBLICATIONS

Tdoc R2-130231, Ericsson et al., Handling of HARQ RTT Timer and drx-RetransmissionTimer, 3GPP TSG-RAN WG2 #81, Malta, Jan. 28-Feb. 1, 2013, 4 pages.
(Continued)

*Primary Examiner* — Abdullahi Ahmed
(74) *Attorney, Agent, or Firm* — Rimon PC

(57) ABSTRACT

This application discloses a HARQ process control method and an apparatus, and relates to the field of communications technologies. The method includes: A first terminal apparatus determines that a TB transmitted in a first HARQ process is a first TB transmitted for the last time or a newly transmitted TB; and stops a first timer. Further, the first terminal apparatus sends, to a second terminal apparatus, first indication information used to indicate that the TB transmitted in the first HARQ process is a newly transmitted TB. The second terminal apparatus receives the first indication information, and stops a second timer based on the first indication information.

12 Claims, 5 Drawing Sheets

(58) Field of Classification Search
CPC ... H04L 1/1848; H04L 1/1896; H04L 1/1822; H04W 72/20
See application file for complete search history.

(56) References Cited

U.S. PATENT DOCUMENTS

| | | | |
|---|---|---|---|
| 2020/0029318 A1* | 1/2020 | Guo | H04L 1/1822 |
| 2020/0304247 A1* | 9/2020 | Loehr | H04L 1/1822 |
| 2021/0022127 A1* | 1/2021 | Xu | H04W 72/20 |
| 2021/0045178 A1* | 2/2021 | Kung | H04W 76/18 |
| 2021/0050979 A1* | 2/2021 | Hui | H04W 72/02 |
| 2021/0204297 A1* | 7/2021 | Wu | H04L 5/001 |
| 2022/0408412 A1* | 12/2022 | Lee | H04L 1/1893 |

OTHER PUBLICATIONS

3GPP TS 38.321 V15.7.0 (Sep. 2019), 3rd Generation Partnership Project; Technical Specification Group Radio Access Network;NR;Medium Access Control (MAC) protocol specification(Release 15), total 78 pages.
Samsung: "On Physical Layer Procedures for NR V2X", 3GPP Draft; R1-1901048, 3rd Generation Partnershipproject (3GPP), Mobile Competence Centre ; 650, Route Deslucioles; F-06921 Sophia-Antipolis Cedex; Francevol. RAN WG1, No. Taipei, Taiwan; Jan. 21, 2019-Jan. 25, 2019 Jan. 11, 2019 (Jan. 11, 2019), XP051576582,

* cited by examiner

HARQ PROCESS CONTROL METHOD AND APPARATUS

CROSS-REFERENCE TO RELATED APPLICATIONS

This application is a continuation of International Application No. PCT/CN2019/109783, filed on Oct. 1, 2019, which is incorporated herein by reference in its entirety.

TECHNICAL FIELD

Embodiments of this application relate to the field of communications technologies, and in particular, to a hybrid automatic repeat request (HARQ) process control method and an apparatus.

BACKGROUND

In a vehicle-to-everything (V2X) communications system, wireless communication may be performed between terminal apparatuses through a direct link, for example, a sidelink (SL). To improve communication quality of the direct link, a HARQ mechanism is introduced in the V2X communications system, and in the HARQ mechanism, data is sent based on a stop-and-wait protocol. In the stop-and-wait protocol, after sending one transport block (TB), a transmit end stops and waits for acknowledgment information. After receiving the TB, a receive end may use 1-bit information for confirmation of an acknowledgment (ACK) or a negative acknowledgment (NACK) of the TB.

However, the transmit end stops and waits for an acknowledgment each time the transmit end transmits a TB, resulting in a low throughput. Therefore, a plurality of parallel HARQ processes are used. When waiting for acknowledgment information in one HARQ process, the transmit end may continue to send data in another HARQ process. These HARQ processes jointly form one HARQ entity. This entity incorporates a stop-and-wait protocol, and allows continuous transmission of data.

The transmit end and the receive end each maintain a timer associated with each HARQ process, and the duration of transmitting a TB in the HARQ process is limited by using the timer. However, in a current mechanism, the transmit end and the receive end have different understandings of the timers of each other, resulting in a low utilization of the HARQ process.

SUMMARY

In view of this, embodiments of this application provide a HARQ process control method and an apparatus, to ensure that a receive end and a transmit end have the same timer associated with the same HARQ process, release a HARQ process and a resource in a timely manner, improve utilization of the HARQ process, and improve system data transmission efficiency.

To achieve the foregoing objectives, the following technical solutions are used in embodiments of this application.

According to a first aspect, an embodiment of this application provides a HARQ process control method. The method includes: A first terminal apparatus determines that a TB transmitted in a first HARQ process is a first TB transmitted for the last time or a newly transmitted TB, or that a quantity of times of transmitting a first TB in a first HARQ process reaches a maximum quantity of transmission times; and stops a first timer.

Further, the first terminal apparatus further sends, to a second terminal apparatus, first indication information used to indicate that the TB transmitted in the first HARQ process is a newly transmitted TB or a first TB transmitted for the last time, or first indication information used to indicate that the quantity of times of transmitting the first TB in the first HARQ process reaches the maximum quantity of transmission times, to instruct the second terminal apparatus to stop a second timer.

According to a second aspect, an embodiment of this application further provides a HARQ process control method. The method includes: A first terminal apparatus determines that a quantity of times of receiving a NACK is equal to or exceeds M times, where M is an integer greater than or equal to 1, and the NACK is used to indicate that a second terminal apparatus does not correctly receive a first TB transmitted in a first HARQ process; and stops a first timer.

According to the method in the first aspect, when the first terminal apparatus determines that a condition for triggering a stop of a first timer associated with the first HARQ process is met, the first terminal apparatus stops the first timer, and sends the first indication information to the second terminal apparatus, to indicate, based on the first indication information, that the condition for triggering the stop of the first timer associated with the first HARQ process is met, so that the second terminal apparatus stops, based on an indication of the first indication information, a second timer that is in the second terminal apparatus and that is associated with a HARQ process associated with the first HARQ process. Therefore, a transmit end and a receive end can stop, based on a same trigger event, respectively maintained timers associated with a HARQ process. The acts that the transmit end and the receive end stop their respectively maintained timers associated with a HARQ process are aligned, to avoid a problem that the transmit end and the receive end have different stop times of their respectively maintained timers associated with the HARQ process, and consequently, a HARQ of the receive end is locked and cannot be used to transmit another TB, wasting a resource.

According to the method in the second aspect, the transmit end may maintain, based on a quantity of times of receiving a NACK sent by the receive end, a timer associated with a HARQ process, and maintain, based on a parameter that does not need to be exchanged and that is learned of by both the transmit end and the receive end, the timer associated with a HARQ process, to ensure that the transmit end and the receive end have the same stop times of their respectively maintained timers associated with a HARQ process, and improve utilization of a HARQ process and a resource.

In a possible design, with reference to the first aspect or the second aspect, the method further includes: The first terminal apparatus releases the first HARQ process, and/or the first terminal apparatus sends, to a network device, a release notification used to instruct the network device to release the first HARQ. In this design, after stopping the first timer, the first terminal apparatus may release, in a timely manner, the first HARQ process and a sidelink transmission resource corresponding to the first TB transmitted in the first HARQ process, to avoid wasting a resource, improve utilization of a HARQ process, and improve system data transmission efficiency.

In a possible design, with reference to any one of the first aspect, the possible designs of the first aspect, the second aspect, and the possible designs of the second aspect, the first timer and duration of the first timer are configured by the first terminal apparatus; and data on one or more LCHs is multiplexed for the first TB, and the duration of the first timer is equal to a first parameter corresponding to an LCH with a highest priority in the one or more LCHs: or data on one or more logical channels LCHs is multiplexed for the first TB, and the duration of the first timer is equal to a first parameter with a smallest value in a first parameter corresponding to the one or more LCHs. The first parameter corresponding to the LCH may be a timer duration parameter of the LCH, and the first parameter corresponding to the LCH may be a preconfigured parameter or may be configured by the network device. In this possible design, the duration of the first timer may be configured at a granularity of an LCH. For example, the duration of the first timer is configured as a duration parameter corresponding to an LCH with a high priority, or is configured as a duration parameter with a smallest value in a duration parameter corresponding to the LCH, so that a TB transmitted within an expiration period of the first timer meets a quality of service requirement or a delay requirement of each LCH multiplexed for the TB.

In another possible design, with reference to any one of the first aspect, the possible designs of the first aspect, the second aspect, or the possible designs of the second aspect, the first timer and the duration of the first timer may be preconfigured parameters or may be configured by the network device. In this design, the network device may configure a related parameter of the first timer, for example, the duration of the first timer, to improve management of a timer on a network side. In addition, the first terminal apparatus does not need to perform configuration, to reduce design complexity of the first terminal apparatus.

In still another possible design, with reference to any one of the first aspect, the possible designs of the first aspect, the second aspect, or the possible designs of the second aspect, the method further includes: The first terminal apparatus receives a new transmission indication, and starts the first timer based on the new transmission indication. The new transmission indication is used to instruct the first terminal apparatus to transmit a new TB in the first HARQ process. The new transmission indication may be carried in DCI or a MAC CE message. Alternatively, the first terminal apparatus receives a NACK sent by the second terminal apparatus, and starts the first timer. The NACK is used to indicate that the second terminal apparatus does not correctly receive the first TB, and N is an integer greater than or equal to 1. Alternatively, the first terminal apparatus determines to retransmit the first TB to the second terminal apparatus in the first HARQ process, and starts the first timer. In this design, the first terminal apparatus may start the first timer in a timely manner when the first terminal apparatus transmits a new TB, receives the NACK, or retransmits the first TB. This is simple and easy to implement, ensures normal transmission of a TB, and improves TB transmission reliability.

In still another possible design, with reference to any one of the first aspect, the possible designs of the first aspect, the second aspect, or the possible designs of the second aspect, the method further includes: If the first timer does not expire and/or the quantity of times of transmitting the first TB does not reach the maximum quantity of transmission times, if the second terminal apparatus does not correctly receive the first TB and/or a resource used to transmit the first TB is less than a preset threshold, and/or no repetition resource remains and/or no resource is reserved if a repetition is configured, the first terminal apparatus obtains a new resource used to transmit the first TB: or if the first timer does not expire, the quantity of times of transmitting the first TB does not reach the maximum quantity of transmission times, a resource used to transmit the first TB is less than a preset threshold, and/or no repetition resource remains if a repetition is configured, the first terminal apparatus obtains a new resource used to transmit the first TB.

That the first terminal apparatus obtains a new resource used to transmit the first TB includes: The first terminal apparatus obtains the resource used to transmit the first TB from the network device, or the first terminal apparatus independently selects the resource used to transmit the first TB: or the first terminal device triggers a resource request, sends the resource request to a network, and waits for the network device to allocate a transmission resource: or the first terminal device triggers resource reselection to select a transmission resource from a preconfigured or configured resource pool, or reserves a retransmission resource.

In this possible design, in a running period of a timer and/or when the quantity of transmission times of the first TB does not reach the maximum quantity of transmission times, but the resource used to transmit the first TB is insufficient, the first terminal apparatus may request a new sidelink resource used to transmit the first TB, to ensure normal transmission of the first TB.

In yet another possible design, with reference to any one of the first aspect, the possible designs of the first aspect, the second aspect, or the possible designs of the second aspect, the method further includes: The first terminal apparatus receives an ACK fed back by the second terminal apparatus, and the first terminal apparatus clears a buffer associated with the first HARQ process. The ACK is used to indicate that the second terminal apparatus correctly receives the first TB transmitted by the first terminal apparatus in the first HARQ process. Alternatively, the first terminal apparatus receives a new transmission indication from the network device, and the first terminal apparatus clears, based on the new transmission indication, a buffer associated with the first HARQ process. The new transmission indication is used to instruct the first terminal apparatus to transmit a new TB in the first HARQ process, for example, a second TB. Alternatively, when the first terminal apparatus successfully sends, to the second terminal apparatus in the first HARQ process, a first TB transmitted for the last time, the first terminal apparatus clears a buffer associated with the second HARQ process. In this possible design, after successfully transmitting a TB, transmitting a new TB, or successfully transmitting the first TB transmitted for the last time, the first terminal apparatus may clear the buffer associated with the first HARQ process, to store another new TB by using the buffer associated with the first HARQ process. Therefore, a buffer associated with a HARQ process in which the first TB is successfully transmitted or that is unsuitable to transmit the first TB may be cleared in a timely manner, to improve a storage capability of the first terminal apparatus. In addition, a new TB is transmitted, to improve utilization of the HARQ process.

According to a third aspect, an embodiment of this application further provides an apparatus. The apparatus may be a first terminal apparatus, a chip in the first terminal apparatus, or a system on chip, or may be a functional module that is in the first terminal apparatus and that is configured to implement the method according to any one of the first aspect, the second aspect, the possible designs of the first aspect, and the possible designs of the second aspect. The apparatus may implement functions performed by the first terminal apparatus in the foregoing aspect or the possible designs, and the functions may be implemented by hardware by executing corresponding software. The hardware or the software includes one or more modules corresponding to the functions. For example, the apparatus may include a processing unit. Further, the apparatus further includes a sending unit.

In an example, the processing unit is configured to: determine that a TB transmitted in a first HARQ process is a first TB transmitted for the last time and a newly transmitted TB, or that a quantity of times of transmitting a first TB in a first HARQ process reaches a maximum quantity of transmission times; and stop a first timer.

The sending unit is configured to send first indication information to a second terminal apparatus. The first indication information is used to indicate that the transport block TB transmitted in the first HARQ process is a first TB transmitted for the last time or a newly transmitted TB, or is used to indicate that the quantity of times of transmitting the first TB in the first HARQ process reaches the maximum quantity of transmission times.

In another example, the processing unit is configured to: determine that a quantity of times of receiving a negative acknowledgment NACK is equal to or exceeds M times, and stop a first timer.

According to the method in the third aspect, when determining that a condition for triggering a stop of a first timer associated with the first HARQ process is met, the first terminal apparatus stops the first timer, and sends the first indication information to the second terminal apparatus, to indicate, based on the first indication information, that the condition for triggering the stop of the first timer associated with the first HARQ process is met, so that the second terminal apparatus stops, based on an indication of the first indication information, a second timer that is in the second terminal apparatus and that is associated with a HARQ process associated with the first HARQ process. Alternatively, the first terminal apparatus stops, based on a quantity of times that transmission of a TB fails, a timer associated with a HARQ process. Therefore, a transmit end and a receive end stop, based on a same trigger event, respectively maintained timers associated with a HARQ process. The acts that the transmit end and the receive end stop their respectively maintained timers associated with a HARQ process are aligned, to avoid a problem that the transmit end and the receive end have different stop times of their respectively maintained timers associated with the HARQ process, and consequently, a HARQ of the receive end is locked and cannot be used to transmit another TB, wasting a resource.

In a possible design, with reference to the third aspect, the processing unit is further configured to: release the first HARQ process, and/or send, to a network device by using the sending unit, a release notification used to instruct the network device to release the first HARQ.

In this design, after or while stopping the first timer (a specific moment is not limited), the first terminal apparatus may optionally release, in a timely manner, the first HARQ process and a sidelink transmission resource corresponding to the first TB transmitted in the first HARQ process, to avoid wasting a resource, improve utilization of a HARQ process, and improve system data transmission efficiency.

In a possible design, with reference to any one of the third aspect or the possible designs of the third aspect, the first timer and duration of the first timer are configured by the first terminal apparatus; and data on one or more LCHs is multiplexed for the first TB, and the duration of the first timer is equal to a first parameter corresponding to an LCH with a highest priority in the one or more LCHs; or data on one or more logical channels LCHs is multiplexed for the first TB, and the duration of the first timer is equal to a first parameter with a smallest value in a first parameter corresponding to the one or more LCHs. The first parameter corresponding to the LCH is timer duration in configuration of the LCH, and the first parameter corresponding to the LCH is a preconfigured parameter or is configured by the network device.

In this possible design, the duration of the first timer may be configured at a granularity of an LCH. For example, the duration of the first timer is configured as a duration corresponding to an LCH with a high priority, or a duration with a smallest value in duration corresponding to the LCH, so that a TB transmitted within an expiration period of the first timer meets a quality of service requirement of each LCH.

In another possible design, with reference to any one of the third aspect or the possible designs of the third aspect, the first timer and the duration of the first timer are preconfigured parameters or are configured by the network device.

In this possible design, the network device may configure a related parameter of the first timer, for example, the duration of the first timer, to improve management of a timer on a network side. In addition, the first terminal apparatus does not need to perform configuration, to reduce design complexity of the first terminal apparatus.

In still another possible design, with reference to any one of the third aspect or the possible designs of the third aspect, the apparatus further includes: a receiving unit, configured to receive a new transmission indication. The processing unit is configured to start the first timer based on the new transmission indication. The new transmission indication is used to instruct the first terminal apparatus to transmit a new TB in the first HARQ process, and the new transmission indication is carried in DCI or a MAC CE. Alternatively, the first terminal apparatus receives a NACK sent by the second terminal apparatus, and starts the first timer. The NACK is used to indicate that the second terminal apparatus does not correctly receive the first TB, and N is an integer greater than or equal to 1. Alternatively, the first terminal apparatus determines to retransmit the first TB to the second terminal apparatus in the first HARQ process, and starts the first timer.

In this possible design, the first timer may be started when a new TB is transmitted, the NACK is received, or the first TB is retransmitted. This is simple and easy to implement, ensures normal transmission of a TB, and improves TB transmission reliability.

In yet another possible design, with reference to any one of the third aspect or the possible designs of the third aspect, the processing unit is further configured to: if the first timer does not expire and/or the quantity of times of transmitting the first TB does not reach the maximum quantity of transmission times, the second terminal apparatus does not correctly receive the first TB, and a resource used to transmit the first TB is less than a preset threshold, obtain a new resource used to transmit the first TB: or if the first timer does not expire, the quantity of times of transmitting the first TB does not reach the maximum quantity of transmission times, and a resource used to transmit the first TB is less than a preset threshold, obtain a new resource used to transmit the first TB.

In this possible design, in a running period of a timer and/or when the quantity of transmission times of the first TB does not reach the maximum quantity of transmission times, but the resource used to transmit the first TB is insufficient, a new sidelink resource used to transmit the first TB may be requested, to ensure normal transmission of the first TB.

In still yet another possible design, with reference to any one of the third aspect or the possible designs of the third aspect, the receiving unit is further configured to receive an ACK fed back by the second terminal apparatus, and the processing unit is configured to clear a buffer associated with the first HARQ process. The ACK is used to indicate that the second terminal apparatus correctly receives the first TB transmitted by the first terminal apparatus in the first HARQ process. Alternatively, the receiving unit is configured to: receive a new transmission indication from the network device, and clear, based on the new transmission indication, a buffer associated with the second HARQ process. The new transmission indication is used to instruct the first terminal apparatus to transmit the new TB in the first HARQ process. Alternatively, when the first terminal apparatus successfully sends, to the second terminal apparatus in the first HARQ process, a first TB transmitted for the last time, the processing unit is further configured to clear a buffer associated with the second HARQ process.

In this possible design, after a TB is successfully transmitted, when a new TB is transmitted, or after the first TB transmitted for the last time is successfully transmitted, the buffer associated with the first HARQ process may be cleared, to store another new TB by using the buffer associated with the first HARQ process. Therefore, a buffer associated with a HARQ process in which a TB is successfully transmitted or that is inconducive to transmit a TB may be cleared in a timely manner, to improve a storage capability of the first terminal apparatus. In addition, a new TB is transmitted, to improve utilization of the HARQ process.

According to a fourth aspect, an apparatus is provided. The apparatus may be a first terminal apparatus, a chip in the first terminal apparatus, or a system on chip. The apparatus may implement a function performed by the first terminal apparatus in the foregoing aspects or the possible designs, and the function may be implemented by using hardware. In a possible design, the apparatus may include at least one processor and a transceiver circuit, and a related program instruction is executed in the at least one processor, so that the communications apparatus implements any one of the first aspect, the second aspect, the possible designs of the first aspect, and the possible designs of the second aspect. For example, the processor determines that a TB transmitted in a first HARQ process is a first TB transmitted for the last time or a newly transmitted TB, or that a quantity of times of transmitting a first TB in a first HARQ process reaches a maximum quantity of transmission times: stops a first timer; and sends first indication information to a second terminal apparatus by using a transceiver circuit. The first indication information is used to indicate that a transport block TB transmitted in the first HARQ process is a first TB transmitted for the last time or a newly transmitted TB, or is used to indicate that the quantity of times of transmitting the first TB in the first HARQ process reaches the maximum quantity of transmission times. Alternatively, the processor determines that a quantity of times of receiving a negative acknowledgment NACK is equal to or exceeds M times, and stops the first timer. In another possible design, the apparatus may further include a memory. The memory is configured to store computer-executable instructions and data that are necessary for the apparatus. When the apparatus runs, the processor executes the computer-executable instructions stored in the memory, so that the apparatus performs the HARQ process control method according to any one of the first aspect or the possible designs of the first aspect.

According to a fifth aspect, a computer-readable storage medium is provided. The computer-readable storage medium may be a readable nonvolatile storage medium, the computer-readable storage medium stores instructions, and when the instructions run on a computer, the computer is enabled to perform the HARQ process control method according to any one of the first aspect, the second aspect, or the possible designs of the foregoing aspects.

According to a sixth aspect, a computer program product including instructions is provided. When the instructions run on a computer, the computer is enabled to perform the HARQ process control method according to any one of the first aspect, the second aspect, or the possible designs of the foregoing aspects.

According to a seventh aspect, an apparatus is provided. The apparatus may be a first terminal apparatus, a chip in the first terminal apparatus, or a system on chip, and the apparatus includes one or more processors and one or more memories. The one or more memories are coupled to the one or more processors, the one or more memories are configured to store computer program code, the computer program code includes computer instructions, and when the one or more processors execute the computer instructions, the apparatus is enabled to perform the HARQ process control method according to any one of the first aspect, the second aspect, or the possible designs of the foregoing aspects.

For technical effects brought by any design manner in the third aspect to the seventh aspect, refer to technical effects brought by any one of the first aspect, the second aspect, the possible designs of the first aspect, and the possible designs of the second aspect. Details are not described again.

According to an eighth aspect, an embodiment of this application further provides a HARQ process control method. The method further includes: A second terminal apparatus receives, from a first terminal apparatus, first indication information used to indicate that a TB transmitted in a first HARQ process is a first TB transmitted for the last time or a newly transmitted TB, or first indication information used to indicate that a quantity of times of transmitting a first TB in a first HARQ process reaches a maximum quantity of transmission times, and stops a second timer based on the first indication information.

According to a ninth aspect, an embodiment of this application further provides a HARQ process control method. The method includes: A second terminal apparatus determines that a quantity of times of feeding back a NACK to a first terminal apparatus exceeds M times, and stops a second timer.

According to the method in the eighth aspect or the ninth aspect, when determining that a condition for triggering a stop of a first timer associated with a first HARQ process is met, the first terminal apparatus sends first indication information to the second terminal apparatus, to indicate, based on the first indication information, that the condition for triggering the stop of the first timer associated with the first HARQ process is met, so that the second terminal apparatus stops, based on an indication of the first indication information, a second timer that is in the second terminal apparatus and that is of a HARQ process associated with the first HARQ process. Alternatively, the second terminal apparatus stops, based on a quantity of times that transmission of a TB fails, a timer associated with a HARQ process. Therefore, a transmit end and a receive end stop, based on a same trigger event, respectively maintained timers associated with a HARQ process. The acts that the transmit end and the receive end stop their respectively maintained timers associated with a HARQ process are aligned, to avoid a problem that the transmit end and the receive end have different stop times of their respectively maintained timers associated with the HARQ process, and consequently, a HARQ of the receive end is locked and cannot be used to transmit another TB, wasting a resource.

In a possible design, with reference to any one of the eighth aspect, the ninth aspect, the possible designs of the eighth aspect, and the possible designs of the ninth aspect, M is configured by the first terminal apparatus for the second terminal apparatus.

In this possible design, the first terminal apparatus may configure the maximum quantity of transmission times for the second terminal apparatus, so that the transmit end and the receive end have the same maximum quantity of transmission times, and further, the transmit end and the receive end align time points at which the transmit end and the receive end stop timers based on a maximum quantity of transmission times of a TB.

In a possible design, with reference to any one of the eighth aspect, the ninth aspect, the possible designs of the eighth aspect, and the possible designs of the ninth aspect, the second terminal apparatus receives configuration information from the first terminal apparatus, and starts the second timer based on the configuration information. The configuration information is used to instruct the second terminal apparatus to start the second timer. Alternatively, the second terminal apparatus receives a restart indication that is from a network device and that is used to indicate to restart the second timer, and starts the second timer based on the restart indication.

In this possible design, the second terminal apparatus may start the second timer based on an indication of the first terminal apparatus or an indication of the network device, so that a time at which a timer is started is aligned with a time at which the transmit end starts a timer.

In a possible design, with reference to any one of the eighth aspect, the ninth aspect, the possible designs of the eighth aspect, and the possible designs of the ninth aspect, the second timer and duration of the second timer are preconfigured parameters or are configured by the network device: or the second timer and duration of the second timer are configured by the first terminal apparatus: or the second timer and duration of the second timer are configured by the second terminal apparatus.

In this possible design, the first terminal apparatus may configure a timer and duration of the timer, so that the transmit end and the receive end have the same timer.

In a possible design, with reference to any one of the eighth aspect, the ninth aspect, the possible designs of the eighth aspect, and the possible designs of the ninth aspect, the method further includes: In a running period of the second timer, the second terminal apparatus feeds back an ACK or a NACK corresponding to the first TB to the first terminal apparatus: or in a running period of the second timer, the second terminal apparatus performs combination processing on a TB in a buffer associated with the second HARQ process.

In this possible design, it can be ensured that the second terminal apparatus normally processes a received TB in a running period of the second timer, to improve processing efficiency and transmission reliability of the TB.

In a possible design, with reference to any one of the eighth aspect, the ninth aspect, the possible designs of the eighth aspect, and the possible designs of the ninth aspect, the method further includes: The second terminal apparatus clears the buffer associated with the second HARQ process, and the second terminal apparatus stops receiving the first TB in the second HARQ process, and receives a second TB in the second HARQ process.

In this possible design, the second terminal apparatus may clear the buffer associated with the second HARQ process, and store another new TB by using the buffer associated with the second HARQ process. Therefore, a buffer associated with a HARQ process in which a TB is successfully transmitted or that is inconducive to transmit a TB may be cleared in a timely manner, to improve a storage capability of the second terminal apparatus. In addition, a new TB is transmitted, to improve utilization of the HARQ process.

According to a tenth aspect, an embodiment of this application further provides an apparatus. The apparatus may be a second terminal apparatus, a chip in the second terminal apparatus, or a system on chip, or may be a functional module that is in the second terminal apparatus and that is configured to implement the method according to any one of the eighth aspect, the ninth aspect, the possible designs of the eighth aspect, and the possible designs of the ninth aspect. The apparatus may implement functions performed by the second terminal apparatus in the foregoing aspects or the possible designs, and the functions may be implemented by hardware by executing corresponding software. The hardware or the software includes one or more modules corresponding to the functions. For example, the apparatus may include a receiving unit and a processing unit.

In an example, the receiving unit is configured to receive first indication information from a first terminal apparatus. The first indication information is used to indicate that a transport block TB transmitted in a first HARQ process is a first TB transmitted for the last time or a newly transmitted TB: or is used to indicate that a quantity of times of transmitting a first TB in a first HARQ process reaches a maximum quantity of transmission times.

The processing unit is configured to stop a second timer based on the first indication information. The second timer is associated with a second HARQ process, and the second HARQ process is associated with the first HARQ process.

In another example, the processing unit is configured to: determine that a quantity of times of feeding back a negative acknowledgment NACK to a first terminal apparatus exceeds M times, and stop a second timer.

According to the apparatus in the tenth aspect, when it is determined that a condition for triggering a stop of a first timer associated with the first HARQ process is met, the first indication information may be sent to the second terminal apparatus, to indicate, based on the first indication information, that the condition for triggering the stop of the first timer associated with the first HARQ process is met, so that the second terminal apparatus stops, based on an indication of the first indication information, a second timer that is in the second terminal apparatus and that is of a HARQ process associated with the first HARQ process. Alternatively, the second terminal apparatus stops, based on a quantity of times that transmission of a TB fails, a timer associated with a HARQ process. Therefore, a transmit end and a receive end stop, based on a same trigger event, respectively maintained timers associated with a HARQ process. The acts that the transmit end and their receive end stop the respectively maintained timers associated with a HARQ process are aligned, to avoid a problem that the transmit end and the receive end have different stop times of their respectively maintained timers associated with the HARQ process, and consequently, a HARQ of the receive end is locked and cannot be used to transmit another TB, wasting a resource.

In a possible design, with reference to the tenth aspect, M is configured by the first terminal apparatus for the second terminal apparatus.

In this possible design, the first terminal apparatus may configure the maximum quantity of transmission times for the second terminal apparatus, so that the transmit end and the receive end have the same maximum quantity of transmission times, and further, the transmit end and the receive end align time points at which the transmit end and the receive end stop timers based on a maximum quantity of transmission times of a TB.

In a possible design, with reference to any one of the tenth aspect and the possible designs of the tenth aspect, the processing unit is configured to: receive configuration information from the first terminal apparatus by using the receiving unit, and start the second timer based on the configuration information, where the configuration information is used to instruct the second terminal apparatus to start the second timer: or receive, by using the receiving unit, a restart indication that is from a network device and that is used to indicate to restart the second timer, and start the second timer based on the restart indication.

In this possible design, the second timer may be started based on an indication of the first terminal apparatus or an indication of the network device, so that a time at which a timer is started is aligned with a time at which the transmit end starts a timer.

In a possible design, with reference to any one of the tenth aspect and the possible designs of the tenth aspect, the second timer and duration of the second timer are preconfigured parameters or are configured by the network device: or the second timer and duration of the second timer are configured by the first terminal apparatus: or the second timer and duration of the second timer are configured by the second terminal apparatus.

In this possible design, the first terminal apparatus may configure a timer and duration of the timer, so that the transmit end and the receive end keep the same of the time.

In a possible design, with reference to any one of the tenth aspect or the possible designs of the tenth aspect, the apparatus further includes: a sending unit, configured to feed back, to the first terminal apparatus in a running period of the second timer, an ACK or a NACK corresponding to the first TB: or the processing unit is further configured to perform, in a running period of the second timer, combination processing on a TB in a buffer associated with the second HARQ process.

In this possible design, it can be ensured that the second terminal apparatus normally processes a received TB in a running period of the second timer, to improve processing efficiency and transmission reliability of the TB.

In a possible design, with reference to any one of the tenth aspect or the possible designs of the tenth aspect, the processing unit is further configured to: clear the buffer associated with the second HARQ process, stop receiving the first TB in the second HARQ process, and receive the second TB in the second HARQ process.

In this possible design, the buffer associated with the second HARQ process may be cleared, and another new TB is stored by using the buffer associated with the second HARQ process. Therefore, a buffer associated with a HARQ process in which a TB is successfully transmitted or that is inconducive to transmit a TB may be cleared in a timely manner, to improve a storage capability of the second terminal apparatus. In addition, a new TB is transmitted, to improve utilization of the HARQ process.

According to an eleventh aspect, an apparatus is provided. The apparatus may be a second terminal apparatus, a chip in the second terminal apparatus, or a system on chip. The apparatus may implement a function performed by the second terminal apparatus in the foregoing aspects or the possible designs, and the function may be implemented by using hardware. In a possible design, the apparatus may include at least one processor and a transceiver circuit, and a related program instruction is executed in the at least one processor, so that the communications apparatus implements any one of the eighth aspect, the ninth aspect, the possible designs of the eighth aspect, and the possible designs of the ninth aspect. For example, the processor receives, from a first terminal apparatus by using the transceiver circuit, first indication information that is used to indicate that a transport block TB transmitted in a first HARQ process is a first TB transmitted for the last time or a newly transmitted TB, or first indication information that is used to indicate that a quantity of times of transmitting a first TB in a first HARQ process reaches a maximum quantity of transmission times; and stops a second timer based on the first indication information. Alternatively, the processing unit determines that a quantity of times of feeding back a negative acknowledgment NACK to a first terminal apparatus exceeds M times, and stops a second timer. In another possible design, the apparatus may further include a memory. The memory is configured to store computer-executable instructions and data that are necessary for the apparatus. When the apparatus runs, the processor executes the computer-executable instructions stored in the memory, so that the apparatus performs the HARQ process control method according to any one of the eighth aspect or the possible designs of the eighth aspect.

According to a twelfth aspect, a computer-readable storage medium is provided. The computer-readable storage medium may be a readable nonvolatile storage medium, the computer-readable storage medium stores instructions, and when the instructions run on a computer, the computer is enabled to perform the HARQ process control method according to any one of the eighth aspect or the possible designs of the foregoing aspect.

According to a thirteenth aspect, a computer program product including instructions is provided. When the instructions run on a computer, the computer is enabled to perform the HARQ process control method according to any one of the eighth aspect or the possible designs of the foregoing aspect.

According to a fourteenth aspect, an apparatus is provided. The apparatus may be a second terminal apparatus, a chip in the second terminal apparatus, or a system on chip, and the apparatus includes one or more processors and one or more memories. The one or more memories are coupled to the one or more processors, the one or more memories are configured to store computer program code, the computer program code includes computer instructions, and when the one or more processors execute the computer instructions, the apparatus is enabled to perform the HARQ process control method according to any one of the eighth aspect or the possible designs of the eighth aspect.

For technical effects brought by any design manner in the tenth aspect to the fourteenth aspect, refer to technical effects brought by any one of the eighth aspect, the ninth aspect, the possible designs of the eighth aspect, and the possible designs of the ninth aspect. Details are not described again.

According to a fifteenth aspect, an embodiment of this application further provides a HARQ process control method. The method further includes: When a second terminal apparatus successfully decodes a first TB that corresponds to transmission in a second HARQ process and that is transmitted by a first terminal apparatus: or sends an ACK corresponding to a first TB to a first terminal apparatus: or generates an ACK to be sent to a first terminal apparatus: or receives, from a first terminal apparatus, a new transmission indication used to indicate to transmit a new TB in a second HARQ process: or a distance between a second terminal apparatus and a first terminal apparatus is greater than a preset distance, the second terminal apparatus clears a buffer associated with a second HARQ process, and the second terminal apparatus stops receiving a first TB in the second HARQ process, and receives a second TB in the second HARQ process.

In the method in the fifteenth aspect, when the second terminal apparatus successfully decodes the first TB received by the second terminal apparatus in the second HARQ process: or sends the ACK corresponding to the first TB to the first terminal apparatus: or generates an ACK to be sent to the first terminal apparatus: or receives a new transmission indication from the first terminal apparatus: or the distance between the second terminal apparatus and the first terminal apparatus is greater than a preset distance, the second terminal apparatus clears the buffer associated with the second HARQ process, and stores another new TB in the buffer associated with the second HARQ process. Therefore, a buffer associated with a HARQ process in which a TB is successfully transmitted or that is inconducive to transmit a TB may be cleared in a timely manner, to improve a storage capability of the second terminal apparatus.

According to a sixteenth aspect, an embodiment of this application further provides an apparatus. The apparatus may be a second terminal apparatus, a chip in the second terminal apparatus, or a system on chip, or may be a functional module that is in the second terminal apparatus and that is configured to implement the method in any one of the fifteenth aspect and the possible designs of the fifteenth aspect. The terminal apparatus may implement functions performed by the second terminal apparatus in the foregoing aspects or the possible designs, and the functions may be implemented by hardware by executing corresponding software. The hardware or the software includes one or more modules corresponding to the functions. For example, the apparatus may include a processing unit.

The processing unit is configured to: when a first TB that corresponds to transmission in a second HARQ process and that is transmitted by a first terminal apparatus is successfully decoded: or when an ACK corresponding to a first TB is sent to a first terminal apparatus: or when an ACK to be sent to a first terminal apparatus is generated: or when a new transmission indication used to indicate to transmit a new TB in a second HARQ process is received from a first terminal apparatus; or when a distance between a second terminal apparatus and a first terminal apparatus is greater than a preset distance, the second terminal apparatus clears a buffer associated with a second HARQ process, stop receiving the first TB in the second HARQ process, and receive a second TB in the second HARQ process.

In the apparatus in the sixteenth aspect, when the first TB received by the second terminal apparatus in the second HARQ process is successfully decoded: or the ACK corresponding to the first TB is sent to the first terminal apparatus: or an ACK to be sent to the first terminal apparatus is generated: or a new transmission indication from the first terminal apparatus is received: or the distance between the second terminal apparatus and the first terminal apparatus is greater than the preset distance, the buffer associated with the second HARQ process may be cleared, and another new TB may be stored in the buffer associated with the second HARQ process. Therefore, a buffer associated with a HARQ process in which a TB is successfully transmitted or that is inconducive to transmit a TB may be cleared in a timely manner, to improve a storage capability of the second terminal apparatus.

According to a seventeenth aspect, an apparatus is provided. The apparatus may be a second terminal apparatus, a chip in the second terminal apparatus, or a system on chip. The apparatus may implement a function performed by the second terminal apparatus in the foregoing aspects or the possible designs, and the function may be implemented by using hardware. In a possible design, the apparatus may include at least one processor and a transceiver circuit, and a related program instruction is executed in the at least one processor, so that the communications apparatus implements any one of the fifteenth aspect and the possible designs of the fifteenth aspect. For example, the processing unit is configured to: when a first transport block TB that corresponds to transmission in a second HARQ process and that is transmitted by a first terminal apparatus is successfully decoded: or an acknowledgment ACK corresponding to a first TB is sent to a first terminal apparatus: or an acknowledgment ACK to be sent to a first terminal apparatus is generated: or a new transmission indication from a first terminal apparatus is received: or a distance between a second terminal apparatus and a first terminal apparatus is greater than a preset distance, clear a buffer associated with the second HARQ process, stop receiving the first TB in the second HARQ process, and receive a second TB in the second HARQ process. In another possible design, the apparatus may further include a memory. The memory is configured to store computer-executable instructions and data that are necessary for the apparatus. When the apparatus runs, the processor executes the computer-executable instructions stored in the memory, so that the apparatus performs the HARQ process control method according to any one of the eighth aspect or the possible designs of the eighth aspect.

According to an eighteenth aspect, a computer-readable storage medium is provided. The computer-readable storage medium may be a readable nonvolatile storage medium, the computer-readable storage medium stores instructions, and when the instructions run on a computer, the computer is enabled to perform the HARQ process control method according to any one of the fifteenth aspect or the possible designs of the fifteenth aspect.

According to a nineteenth aspect, a computer program product including instructions is provided. When the instructions run on a computer, the computer is enabled to perform the HARQ process control method according to any one of the fifteenth aspect or the possible designs of the fifteenth aspect.

According to a twentieth aspect, an apparatus is provided. The apparatus may be a second terminal apparatus, a chip in the second terminal apparatus, or a system on chip, and the apparatus includes one or more processors and one or more memories. The one or more memories are coupled to the one or more processors, the one or more memories are configured to store computer program code, the computer program code includes computer instructions, and when the one or more processors execute the computer instructions, the apparatus is enabled to perform the HARQ process control method according to any one of the fifteenth aspect or the possible designs of the fifteenth aspect.

For technical effects brought by any design manner in the fifteenth aspect to the twentieth aspect, refer to technical effects brought by any one of the fifteenth aspect, the ninth aspect, the possible designs of the fifteenth aspect, and the possible designs of the ninth aspect. Details are not described again.

In addition, for an existing operation of stopping a timer based on the timer or a maximum quantity of transmission times cannot meet a quality of service (QOS) requirement of TB transmission, for example, cannot meet a reliability requirement of a TB, embodiments of this application further provide a method:

According to a twenty-first aspect, an embodiment of this application further provides a HARQ process control method. The method includes: A first terminal apparatus transmits a first TB to a second terminal apparatus in a first HARQ process, and the first terminal device determines, based on a maximum quantity of transmission times and/or a first timer, to release the first HARQ process.

In the method in the twenty-first aspect, the first terminal apparatus may comprehensively consider a timer and a maximum quantity of transmission times of a TB, determine, based on the timer and the maximum quantity of transmission times of the TB, whether to release the first HARQ process, and stop a first timer associated with the first HARQ, so that a transmit end does not determine, based on only the timer or the maximum quantity of transmission times of the TB, to release the first HARQ process, to improve a transmission requirement of the TB.

In a possible design, with reference to any one of the twenty-first aspect or the possible designs of the twenty-first aspect, that the first terminal device determines, based on a maximum quantity of transmission times and a first timer, to release the first HARQ process includes: When a quantity of times of transmitting the first TB in the first HARQ process is less than the maximum quantity of transmission times, and the first timer expires/stops, the first terminal apparatus determines to release the first HARQ process.

In this possible design, the timer is mainly used to control the first terminal apparatus to release the first HARQ process, to avoid a problem that a delay is large because all TBs are transmitted.

In a possible design, with reference to any one of the twenty-first aspect or the possible designs of the twenty-first aspect, that the first terminal device determines, based on a maximum quantity of transmission times and a first timer, to release the first HARQ process includes: When a quantity of times of transmitting the first TB in the first HARQ process is equal to or exceeds the maximum quantity of transmission times, the first terminal apparatus determines to release the first HARQ process.

In this possible design, the maximum quantity of transmission times is mainly used to control the first terminal apparatus to release the first HARQ process, to avoid a problem that a resource is wasted in a HARQ process when a timer does not expire and the HARQ process is not released when all TBs are transmitted currently.

In a possible design, with reference to any one of the twenty-first aspect or the possible designs of the twenty-first aspect, the method further includes: The first terminal apparatus notifies the second terminal apparatus that the first timer expires/stops: or that the quantity of times of transmitting the first TB in the first HARQ process is equal to or exceeds the maximum quantity of transmission times: or that the first HARQ process is released.

In this possible design, the first terminal apparatus may notify the second terminal apparatus that the first timer expires/stops, or that the quantity of times of transmitting the first TB in the first HARQ process is equal to or exceeds the maximum quantity of transmission times, or that the first HARQ process is released, so that the second terminal apparatus also releases the second HARQ synchronously, to avoid a problem that a resource is wasted because the second HARQ process is not released, and the HARQ process is locked.

According to a twenty-second aspect, an embodiment of this application further provides an apparatus. The apparatus may be a second terminal apparatus, a chip in the second terminal apparatus, or a system on chip, or may be a functional module that is in the second terminal apparatus and that is configured to implement the method in any one of the twenty-first aspect and the possible designs of the twenty-first aspect. The apparatus may implement functions performed by the second terminal apparatus in the foregoing aspects or the possible designs, and the functions may be implemented by hardware by executing corresponding software. The hardware or the software includes one or more modules corresponding to the functions. For example, the apparatus may include a sending unit and a processing unit.

The sending unit is configured to transmit a first TB to the second terminal apparatus in a first HARQ process.

The processing unit is configured to determine, based on a maximum quantity of transmission times and/or a first timer, to release the first HARQ process.

The apparatus in the twenty-second aspect may comprehensively consider a timer and a maximum quantity of transmission times of a TB, determine, based on the timer and the maximum quantity of transmission times of the TB, whether to release the first HARQ process, and stop a first timer associated with the first HARQ, so that a transmit end does not determine, based on only the timer or the maximum quantity of transmission times of the TB, to release the first HARQ process, to improve a transmission requirement of the TB.

In a possible design, with reference to any one of the twenty-second aspect or the possible designs of the twenty-second aspect, the processing unit is specifically configured to: When a quantity of times of transmitting the first TB in the first HARQ process is less than the maximum quantity of transmission times, and the first timer expires/stops, determine to release the first HARQ process.

In this possible design, the timer is mainly used to control the first terminal apparatus to release the first HARQ process, to avoid a problem that a delay is large because all TBs are transmitted.

In a possible design, with reference to any one of the twenty-second aspect or the possible designs of the twenty-second aspect, the processing unit is specifically configured to: When a quantity of times of transmitting the first TB in the first HARQ process is equal to or exceeds the maximum quantity of transmission times, determine to release the first HARQ process.

In this possible design, the maximum quantity of transmission times is mainly used to control the first terminal apparatus to release the first HARQ process, to avoid a problem that a resource is wasted in a HARQ process when a timer does not expire and the HARQ process is not released when all TBs are transmitted currently.

In a possible design, with reference to any one of the twenty-second aspect or the possible designs of the twenty-second aspect, the processing unit is further configured to: notify the second terminal apparatus that the first timer expires/stops: or that the quantity of times of transmitting the first TB in the first HARQ process is equal to or exceeds the maximum quantity of transmission times: or that the first HARQ process is released.

In this possible design, the first terminal apparatus may notify the second terminal apparatus that the first timer expires/stops, or that the quantity of times of transmitting the first TB in the first HARQ process is equal to or exceeds the maximum quantity of transmission times, or that the first HARQ process is released, so that the second terminal apparatus also releases the second HARQ synchronously, to avoid a problem that a resource is wasted because the second HARQ process is not released, and the HARQ process is locked.

According to a twenty-third aspect, an apparatus is provided. The apparatus may be a second terminal apparatus, a chip in the second terminal apparatus, or a system on chip. The apparatus may implement a function performed by the second terminal apparatus in the foregoing aspects or the possible designs, and the function may be implemented by using hardware. In a possible design, the apparatus may include at least one processor and a transceiver circuit, and a related program instruction is executed in the at least one processor, so that the communications apparatus implements any one of the twenty-first aspect and the possible designs of the twenty-first aspect. For example, the processor transmits a first TB to the second terminal apparatus in a first HARQ process, and a first terminal device determines, based on a maximum quantity of transmission times and/or a first timer, to release the first HARQ process. In another possible design, the apparatus may further include a memory. The memory is configured to store computer-executable instructions and data that are necessary for the apparatus. When the apparatus runs, the processor executes the computer-executable instructions stored in the memory, so that the apparatus performs the HARQ process control method according to any one of the eighth aspect or the possible designs of the eighth aspect.

According to a twenty-fourth aspect, a computer-readable storage medium is provided. The computer-readable storage medium may be a readable nonvolatile storage medium, the computer-readable storage medium stores instructions, and when the instructions run on a computer, the computer is enabled to perform the HARQ process control method according to any one of the twenty-first aspect or the possible designs of the twenty-first aspect.

According to a twenty-fifth aspect, a computer program product including instructions is provided. When the instructions run on a computer, the computer is enabled to perform the HARQ process control method according to any one of the twenty-first aspect or the possible designs of the foregoing aspect.

According to a twenty-sixth aspect, an apparatus is provided. The apparatus may be a second terminal apparatus, a chip in the second terminal apparatus, or a system on chip, and the apparatus includes one or more processors and one or more memories. The one or more memories are coupled to the one or more processors, the one or more memories are configured to store computer program code, the computer program code includes computer instructions, and when the one or more processors execute the computer instructions, the apparatus is enabled to perform the HARQ process control method according to any one of the twenty-first aspect or the possible designs of the twenty-first aspect.

For technical effects brought by any design manner in the twenty-second aspect to the twenty-sixth aspect, refer to technical effects brought by any one of the twenty-first aspect and the possible designs of the twenty-first aspect. Details are not described again.

According to a twenty-seventh aspect, an embodiment of this application further provides a communications system. The communications system may include the first terminal apparatus in any one of the third aspect to the seventh aspect, and the second terminal apparatus in any one of the tenth aspect to the fourteenth aspect: or include the second terminal apparatus in the sixteenth aspect to the twentieth aspect, or the first terminal apparatus in any one of the twenty-second aspect to the twenty-sixth aspect.

DESCRIPTION OF EMBODIMENTS

Before embodiments of this application are described, a HARQ process is explained and described as follows:

The HARQ process is a processing process in which a transmit end schedules one time of data transmission to a receive end, and then the transmit end receives an acknowledgment ACK/a negative acknowledgment NACK. A HARQ operation performed by the transmit end may include transmitting a new TB and retransmitting a TB, and receiving and processing an ACK/a NACK. A HARQ operation performed by the receive end may include receiving a TB, performing soft combination processing, and generating an ACK/a NACK.

One or more HARQ processes form one HARQ entity. The HARQ entity incorporates a stop-and-wait protocol, and allows continuous transmission of data. In each HARQ process, one transport block (TB) is processed within a transmission time interval (TTI). In each HARQ process, each receive end needs an independent HARQ buffer, to perform soft combination on received data.

The transmit end and the receive end each are configured with a HARQ process used to transmit a TB. Each HARQ process is configured with a timer, and the timer may be configured to limit a use time of the HARQ process. During transmission of the TB, the timer associated with the HARQ process is started. Once the timer expires or reaches a preset value, the transmit end and the receive end may transmit another TB based on the HARQ process. The timer associated with the HARQ process is configured based on a packet delay budget (PDB). However, there may be the following problem: (1) The transmit end and the receive end have different stop times of their timerss, and consequently, the acts that the transmit end and the receive end stop the timers are not aligned.

For example, a timer on a receive-end UE side is configured by transmit-end UE, the transmit-end UE starts a timer corresponding to the transmit end, the receive-end UE starts a timer when receiving a timer configuration command sent by the TB, and the timer configuration command is sent to the receive-end UE when the transmit-end UE transmits a first TB to the receive-end UE.

If the receive-end UE misses detecting the timer configuration command from the transmit-end UE, and a timer start/restart time of the transmit end and a timer start/restart time of the receive end are not aligned, when a timer on the transmit-end UE side stops, in other words, the transmit-end UE sends a current TB to the receive-end UE, the timer of the receive-end UE may still be in an operating state, before the timer expires, the receive-end UE still considers that the transmit-end UE retransmits a current TB block, and a HARQ process in the receive-end UE is locked and cannot be used to receive sidelink transmission sent by another transmit-end UE.

Figure 1:
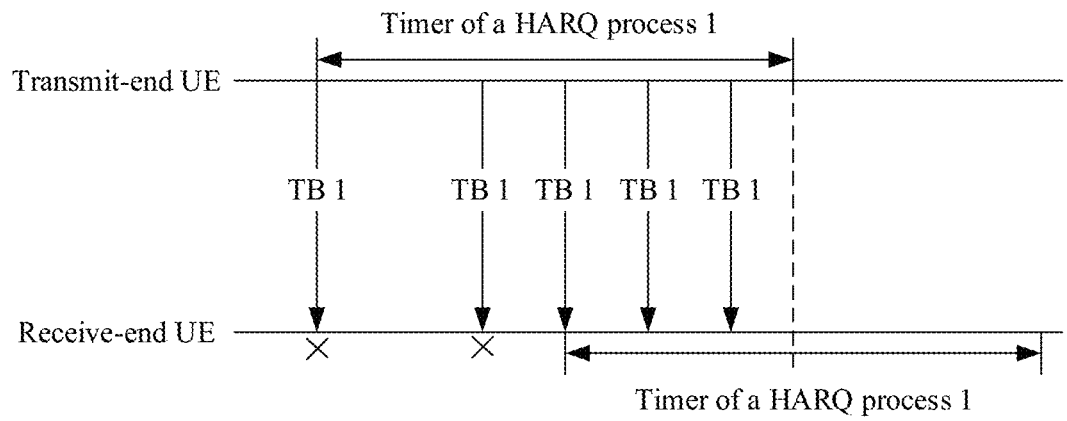
FIG. 1 is a schematic diagram in which a transmit end and a receive end currently have different times.

FIG. 1 is used as an example. FIG. 1 is a schematic diagram in which transmit-end UE transmits a TB 1 to receive-end UE in a HARQ process 1. As shown in FIG. 1, the receive-end UE does not receive the TB 1 sent by the transmit-end UE for the first two times. The receive-end UE does not receive timing configuration information until the $3^{rd}$ time of retransmission of the TB 1, and starts the timer. Consequently, a time at which the receive-end UE starts the timer is later than a time at which the transmit-end UE starts the timer. Therefore, before the timer expires, the receive-end UE still considers that the transmit-end UE retransmits a current TB block, and the HARQ process 1 is locked and cannot be used to receive sidelink transmission sent by another transmit-end UE.

To resolve the foregoing technical problem, an embodiment of this application provides a HARQ process control method. In the method, after determining, in some cases, that a timer associated with a HARQ process is stopped, a transmit end sends indication information to a receive end. After receiving the indication information, the receive end may stop, based on the indication information, a timer associated with the HARQ process. Alternatively, the transmit end and the receive end stop timers based on a same trigger condition. Therefore, the transmit end and the receive end have the same timer associated with the HARQ process. Specifically, for the HARQ process control method, refer to the descriptions in the embodiment corresponding to FIG. 4 or FIG. 5.

The following describes implementations of embodiments of this application in detail with reference to accompanying drawings of this specification.

The HARQ process control method provided in embodiments of this application may be applied to any communications system that supports V2X communication. The communications system may be a 3rd generation partnership project (3GPP) communications system, for example, a long term evolution (LTE) system, may be a 5th generation (5G) mobile communications system, a new radio (NR) system, a vehicle-to-everything (V2X) communications system, or another next generation communications system, or may be a non-3GPP communications system. This is not limited.

Figure 2:
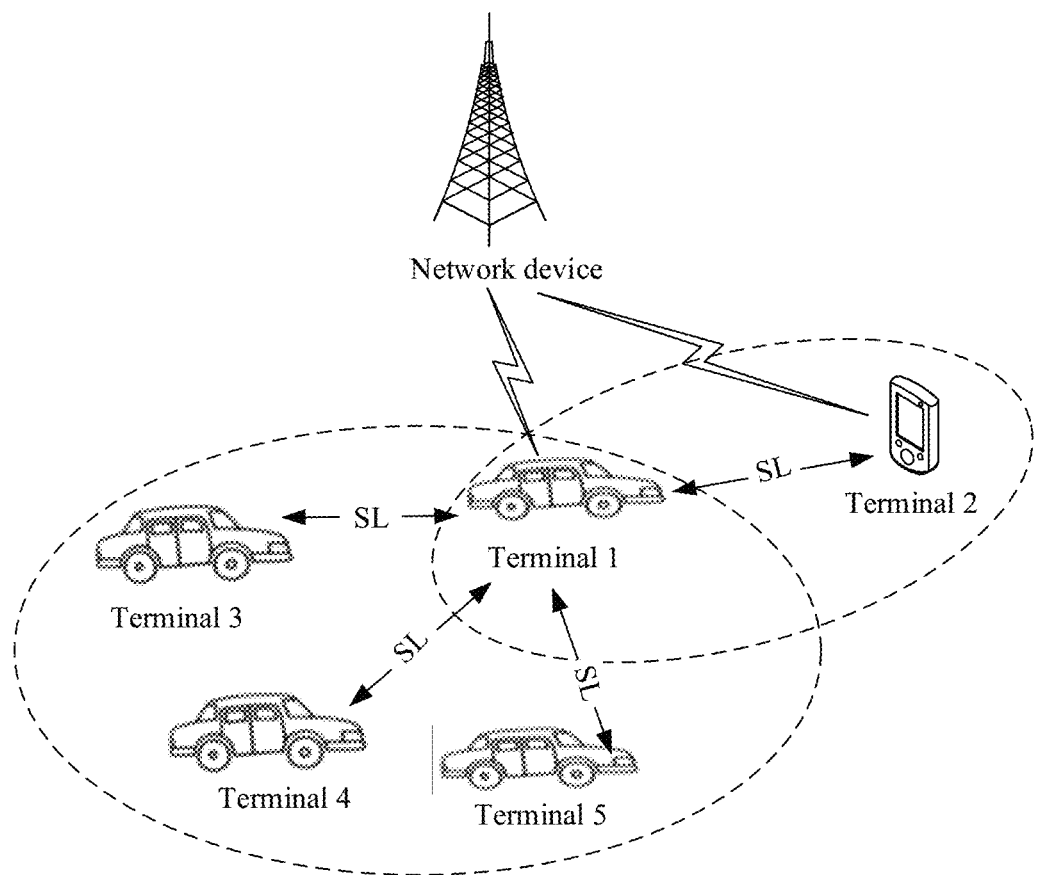
FIG. 2 is a schematic diagram of an architecture of a communications system according to an embodiment of this application.

The following uses FIG. 2 as an example to describe the method provided in this embodiment of this application.

FIG. 2 is a schematic diagram of a communications system according to an embodiment of this application. As shown in FIG. 2, the communications system may include a plurality of terminals and a network device. The terminal may be located within a cell coverage area of the network device, or may be located outside a cell coverage area of the network device. The terminal may communicate with the network device through a Uu interface, or may communicate with another terminal through a sidelink (SL) (or a PC5 interface). The terminal may perform one-to-one communication with another terminal in a unicast manner, or may perform multicast or broadcast communication with a plurality of other terminals in a multicast manner or a broadcast manner. For example, as shown in FIG. 2, a terminal 1 may perform unicast communication with a terminal 2, and send sideline data to the terminal 2 in a unicast manner. The terminal 1 and other three terminals: a terminal 3, a terminal 4, and a terminal 5 may form a multicast group. The terminal 1 may send sidelink data to the terminal 3, the terminal 4, and the terminal 5 in a multicast manner.

The unicast manner in this application may mean that one terminal communicates with another terminal through a one-to-one SL link. The broadcast manner may mean that one terminal broadcasts a message to a surrounding terminal, and the other one or more terminals receive the broadcast message. The multicast manner may mean that one terminal sends data/a message to one or more terminals in the multicast group.

The network device in FIG. 2 may be any device having a wireless transceiver function, and is mainly configured to implement functions such as a radio physical control function, resource scheduling and radio resource management, radio access control, and mobility management. Specifically, the network device may be an access network (AN) device/a radio access network (RAN) device, or may be a device including a plurality of 5G-AN/5G-RAN nodes, or may be a NodeB (NB), an evolved NodeB (eNB), a next generation NodeB (gNB), a transmission reception point (TRP), a transmission point (TP), a road side unit (RSU), any node in another type of access node, or the like. This is not limited.

The terminal in FIG. 2 may be referred to as a terminal apparatus, user equipment (UE), a mobile station (MS), a mobile terminal (MT), or the like. Specifically, the terminal in FIG. 2 may be a mobile phone, a tablet computer, or a computer having a wireless transceiver function. The terminal may alternatively be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a wireless terminal in a smart home, a vehicle-mounted terminal, a vehicle with a vehicle-to-vehicle (V2V) communication capability, an intelligent connected vehicle, or the like. This is not limited. The terminal and the network device in this embodiment of this application each may be one or more chips, or may be a system on chip (SOC), or the like. For specific components of the terminal and the network device, refer to FIG. 3.

It should be noted that FIG. 2 is merely an example accompanying drawing. A quantity of devices included in FIG. 2 is not limited. In addition to the device shown in FIG. 2, a communications architecture may further include another device. In addition, a name of each device in FIG. 2 is not limited. In addition to the names shown in FIG. 2, each device may be named another name. This is not limited.

In the communications system shown in FIG. 2, the terminal may obtain a transmission resource in any one of the following modes: Mode 1: The network device schedules resource allocation. This mode may be referred to as a mode 3 in an LTE-V2X communications system, and may be referred to as a mode 1 in an NR-V2X communications system. In Mode 1, when the terminal needs to transmit data to a peer end through a sidelink, the terminal sends a request to the network device, to request a resource used for sidelink transmission. After receiving the request from the terminal, the network device allocates a sidelink transmission resource to the terminal. Mode 2: The terminal independently selects a resource. This mode may be referred to as a mode 4 in an LTE-V2X communications system, and may be referred to as a mode 2 in an NR-V2X communications system. In Mode 2, the network device may allocate a resource pool including a large quantity of resources to the terminal, or the terminal is preconfigured with a resource pool including a large quantity of resources. A plurality of terminals may select, from a resource pool in a manner in which the terminals sense scheduling or through contention, a sidelink transmission resource required by the plurality of terminals.

Further, after obtaining the sidelink transmission resource in Mode 1 or Mode 2, the terminal, or referred to as a transmit end, sends data to a peer end on the obtained sidelink transmission resource, for example, starts/restarts a timer associated with a HARQ process, in other words, unlocks the timer associated with the HARQ process. In an expiration period/a running period of the timer associated with the HARQ process, a TB is sent to a peer end in the HARQ process. Data on one or more logical channels (LCH) is multiplexed for the TB. Correspondingly, the peer end starts/restarts the timer associated with the HARQ process. In an expiration period/a running period of the timer associated with the HARQ process, after receiving a TB transmitted in the HARQ process, the peer end processes the received TB, and feeds back, to the transmit end, an ACK/a NACK obtained through processing.

It should be noted that, in this embodiment of this application, a transmit end and a receive end are relative concepts. The transmit end may be a terminal or a terminal apparatus that sends a TB on a sidelink in a HARQ process, and the receive end may be a terminal or a terminal apparatus that receives a TB on the sidelink in a HARQ process. The following describes the HARQ process control method provided in this embodiment of this application by using an example in which the transmit end is a first terminal apparatus and the receive end is a second terminal apparatus.

Figure 3:
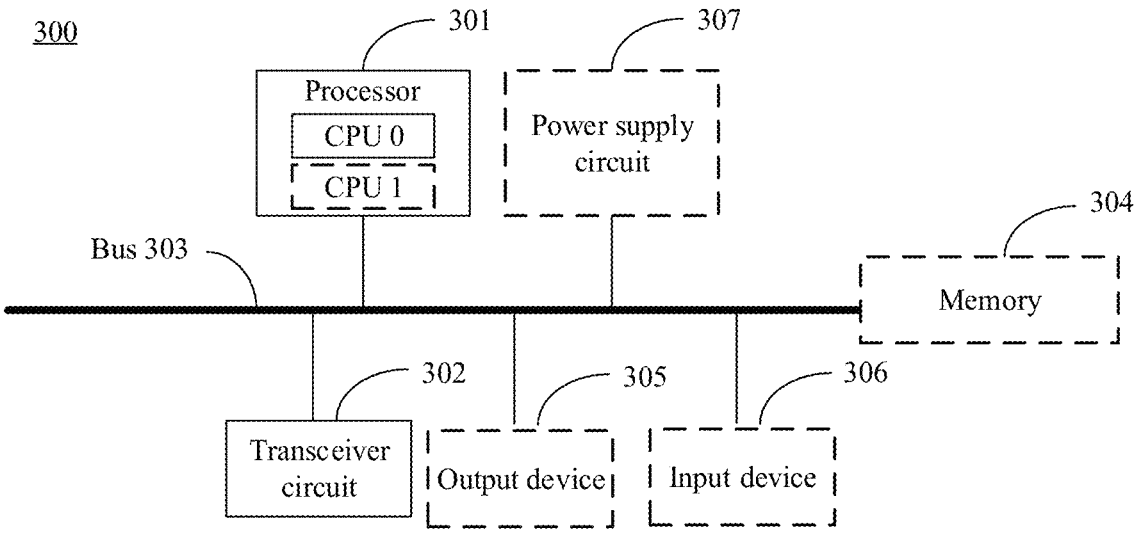
FIG. 3 is a schematic diagram of a composition of an apparatus according to an embodiment of this application.

Each device shown in FIG. 2 such as a terminal and a network device may be of a composition structure shown in FIG. 3 or include components shown in FIG. 3. FIG. 3 is a schematic diagram of a composition of an apparatus 300 according to an embodiment of this application. The apparatus 300 may be a terminal, a chip in the terminal, or a system on chip. As shown in FIG. 3, the apparatus 300 includes a processor 301, a transceiver circuit 302, and a bus 303. Further, the apparatus 300 may include a memory 304. The processor 301, the memory 304, and the transceiver circuit 302 may be connected through the bus 303.

It should be understood that the processor in this embodiment of this application, for example, the processor 301, may be a central processing unit (CPU), a general network processor (NP), a digital signal processor (DSP), a microprocessor, a microcontroller, a programmable logic device (PLD), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like. The processor 301 may alternatively be another apparatus having a processing function, for example, a circuit, a component, or a software module. This is not limited.

The transceiver circuit 302 is configured to communicate with another device or another communications network. The other communications network may be the Ethernet, a radio access network (RAN), a wireless local area network (WLAN), or the like. The transceiver circuit 302 may be a module, a circuit, a transceiver, or any apparatus that can implement communication. The transceiver circuit 302 may be configured to: receive a program instruction, and transmit the program instruction to the processor, or the transceiver circuit 302 may be used by the apparatus 300 to perform communication interaction with another communications device, for example, exchange control signaling and/or service data. The transceiver circuit 302 may be code and/or data read/write transceiver circuit, or the transceiver circuit 302 may be a signal transmission transceiver circuit between a communications processor and a transceiver.

The bus 303 is configured to transfer information between components included in the apparatus 300).

The memory 304 is configured to store instructions. The instructions may be a computer program.

The memory 304 may be a read-only memory (ROM) or another type of static storage device that can store static information and/or instructions, or may be a random access memory (RAM) or another type of dynamic storage device that can store information and/or instructions, an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or the like. This is not limited.

It should be noted that the memory 304 may exist independently of the processor 301, or may be integrated with the processor 301. The memory 304 may be configured to store instructions, program code, some data, or the like. The memory 304 may be located in the apparatus 300, or may be located outside the apparatus 300. This is not limited. The processor 301 is configured to execute the instructions stored in the memory 304, to implement the HARQ process control method provided in the following embodiments of this application.

In an example, the processor 301 may include one or more CPUs, for example, a CPU 0) and a CPU 1 in FIG. 3.

In an optional implementation, the apparatus 300 further includes an output device 305 and an input device 306. For example, the input device 306 is a device, for example, a keyboard, a mouse, a microphone, or a joystick, and the output device 305 is a device, for example, a display screen or a speaker.

In an optional implementation, the apparatus 300 may further include a power supply circuit 307. The power supply circuit 307 may be configured to supply power to the processor 301. The power supply circuit 307 and the processor 301 may be located in a same chip, or located in another chip different from a chip in which the processor 301 is located.

The power supply circuit 307 in this embodiment of this application includes but is not limited to at least one of the following: a power supply line, a power supply electronic system, a power management chip, a power consumption management processor, or a power consumption management control circuit.

It should be noted that the apparatus 300 may be a desktop computer, a portable computer, a network server, a mobile phone, a tablet computer, a wireless terminal, an embedded device, a chip system, or a device having a similar structure in FIG. 3. In addition, the composition structure shown in FIG. 3 does not constitute a limitation on the terminal. In addition to a component shown in FIG. 3, the terminal may include more or fewer components than those shown in FIG. 3, or combine some components, or have different component arrangements.

In embodiments of this application, the chip system may include a chip, or may include a chip and another discrete component.

For example, the apparatus 300 may be a chip system. As shown in FIG. 3, the chip system may include at least one or more processors and a transceiver circuit. Program instructions related to the method in this embodiment of this application are executed in the one or more processors, so that the chip system implements a HARQ process control method.

In addition, mutual reference may be made to actions, terms, and the like in embodiments of this application. This is not limited. In embodiments of this application, names of messages exchanged between devices, names of parameters in the messages, or the like are merely examples. In specific implementation, other names may alternatively be used. This is not limited.

It should be noted that a body that performs the method is not limited in this embodiment of this application. The body may be a terminal, a functional module in the terminal, a chip system, or the like. This is not limited. In this embodiment of this application, a terminal apparatus is used as an example, to describe the method provided in this embodiment of this application.

The architecture shown in FIG. 2 is used as an example below; to describe the HARQ process control method provided in this embodiment of this application. The terminal apparatus in the following embodiments may have the components shown in FIG. 3.

Figure 4:
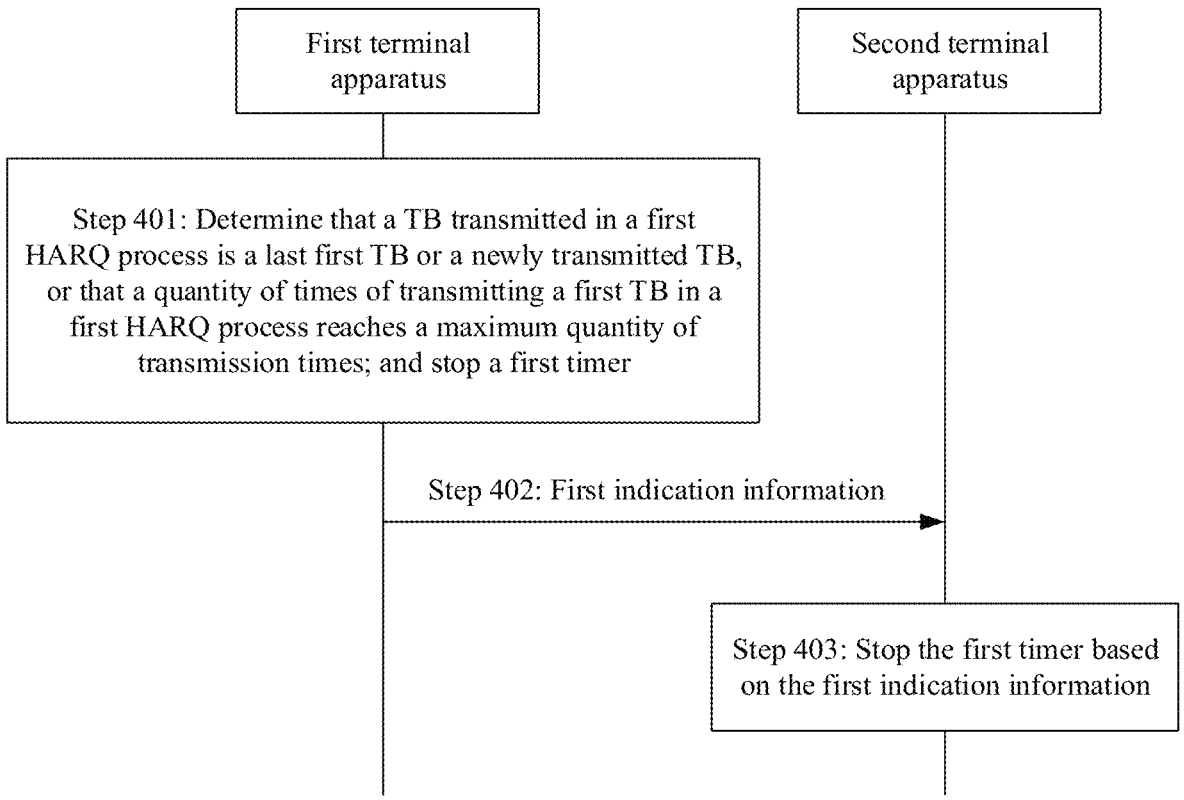
FIG. 4 is a schematic flowchart of controlling a HARQ process according to an embodiment of this application.

FIG. 4 shows a HARQ process control method according to an embodiment of this application. The method may be used to resolve the foregoing technical problem. As shown in FIG. 4, the method may include the following steps.

Step 401: A first terminal apparatus determines that a TB transmitted in a first HARQ process is a first TB transmitted for the last time or a newly transmitted TB, or that a quantity of times of transmitting a first TB in a first HARQ process reaches a maximum quantity of transmission times; and stops a first timer.

The first terminal apparatus may be any terminal in FIG. 2 or a functional module or a chip system in the any terminal. The first terminal apparatus may perform sidelink communication with a second terminal apparatus, and transmit a TB to the second terminal apparatus in the first HARQ process. The second terminal apparatus may be any terminal that receives the TB transmitted by the first terminal apparatus in the first HARQ process in FIG. 2 or a functional module or a chip system in the any terminal. This is not limited. For example, the first terminal apparatus may be the terminal 1 in FIG. 2, and the second terminal apparatus may be the terminal 2 in FIG. 2.

The first HARQ may be any HARQ process in the first terminal apparatus, the first terminal apparatus may transmit the first TB in the first HARQ process, and data on one or more LCHs may be multiplexed for the first TB. In other words, the data on the one or more LCHs may be carried in the first TB, and transmitted after being processed in the first HARQ process. In this embodiment of this application, that the first terminal apparatus transmits the first TB in the first HARQ process may be as follows: After generating the first TB, the first terminal apparatus submits, to the first HARQ process for processing, the first TB and/or resource information and HARQ information that are associated with the TB, sends the processed first TB to the second terminal apparatus by using a sidelink transmission resource corresponding to the first HARQ process or a sidelink transmission resource corresponding to the TB. The HARQ information may include but is not limited to HARQ feedback enabling/disabling, a redundancy version, or the like. For a process in which a HARQ entity processes a TB, refer to the conventional technology. Details are not described.

It should be noted that the TB in each embodiment of this application may also be replaced with a media access control protocol data unit (MAC PDU) or a data packet at another granularity. This is not limited.

The first HARQ process may be associated with/correspond to the first timer. The first terminal apparatus maintains the first timer. For example, the first terminal apparatus triggers a start/restart or a stop of the first timer. The first timer may be used to limit a duration in which the first terminal apparatus sends the first TB in the first HARQ process, or a duration in which the first terminal apparatus uses the first HARQ process to send the first TB. The duration may be a total duration in which the first TB is sent in the first HARQ process for a plurality of times. The first timer may also be used to limit a duration in which the first TB is transmitted each time. In a running period/an expiration period of the first timer, optionally, the first terminal apparatus may repeatedly send the first TB in the first HARQ process. When the first timer expires/stops, the first terminal apparatus stops sending the first TB in the first HARQ process. For example, if a duration of the first timer is configured to be [t1, t2], the first terminal apparatus may send a plurality of first TBs in the first HARQ process in a time period [t1, t2] after the first timer is started.

It should be noted that the first timer is not only associated with the first HARQ process, but also may be associated with/correspond to one or more other HARQ processes in the first terminal apparatus. For example, a timer 1 may be associated with a HARQ process 1 and a HARQ process 2, and may further limit a duration in which a TB is transmitted in the HARQ process 1 and the HARQ process 2.

The maximum quantity of transmission times may be a preset maximum quantity of times of transmitting the first TB, and the maximum quantity of transmission times may also be referred to as a maximum quantity of times of transmitting the first TB or a maximum quantity of transmission times of the first TB. The maximum quantity of transmission times may be preconfigured. That the maximum quantity of transmission times is preconfigured means that the maximum quantity of transmission times is configured at delivery of the first terminal apparatus and may be changed subsequently. Alternatively, the maximum quantity of transmission times may be a fixed value specified in a protocol. For example, a value is a fixed value N, and N is an integer greater than or equal to 1. Alternatively, the maximum quantity of transmission times is configured by the network device for the first terminal apparatus, or the like. This is not limited.

For example, the first terminal apparatus records as 0, an initial value of a quantity of sending times of the first TB/a quantity of times of sending the first TB. Subsequently, after the first terminal apparatus starts to send the first TB to the second terminal apparatus, the quantity of sending times of the first TB is increased by 1 each time the first TB is sent. It should be understood that the quantity of sending times is increased by 1 only after the first terminal apparatus sends the first TB in the first HARQ process; or the quantity of sending times is increased by 1 provided that the first terminal apparatus sends the first TB in the first HARQ process, without limiting whether the first TB is sent in the first HARQ process.

It is assumed that a maximum quantity of transmission times is N, and N is an integer greater than or equal to 1. If the quantity of sending times of the first TB that is recorded by the first terminal apparatus is equal to N, it is determined that the quantity of times of transmitting the first TB in the first HARQ process reached the maximum quantity of transmission times, and it indicates that the first terminal apparatus completed transmission of a plurality of first TBs in the first HARQ process, and the first timer may be stopped. If the quantity of sending times of the first TB that is recorded by the first terminal apparatus is equal to N−1, it is determined that the TB transmitted by the first terminal apparatus in the first HARQ process is a first TB transmitted for the last time or that the first terminal apparatus is to transmit the first TB for the last time. After the first terminal apparatus completes transmission of the first TB currently, transmission of the plurality of first TBs is completed, and the first timer may be stopped.

The newly transmitted TB may be a new TB transmitted in the first HARQ process, and the newly transmitted TB is different from the first TB. Compared with the newly transmitted TB, the first TB may be referred to as an old TB or a current TB. This is not limited.

For example, if the first terminal apparatus receives a new transmission indication from the network device after completing a plurality of times of transmission of the first TB, the new transmission indication may be used to instruct the first terminal apparatus to send a second TB to the second terminal apparatus, or determine, based on the new transmission indication, to transmit a second TB in the first HARQ process, or determine, based on the new transmission indication, to perform a new transmission in the first HARQ process, or determine, based on the new transmission indication, that the first HARQ process is associated with a second resource. The second resource may be different from a corresponding resource for transmitting the first TB. For example, the second resource may be a sidelink resource used to transmit the second TB. Alternatively, the first terminal apparatus/a high layer of the first terminal apparatus (for example, a radio resource control (RRC) layer) determines to transmit the second TB, namely, the new transmitted TB in the first HARQ process, and it indicates that transmission of all first TBs is completed, and the first timer does not need to be used to limit the time in which the first TB is transmitted in the first HARQ process. In this case, the first terminal apparatus may stop the first timer.

In this embodiment of this application, that the first terminal apparatus stops the first timer may mean that the first terminal apparatus stops a first timer maintained by the first terminal apparatus/configured in the first terminal apparatus, or stops a first timer configured for the first HARQ process. Stopping the first timer may mean that the first timer expires and transmission of the first TB in the first HARQ process is stopped or the first TB is no longer transmitted in the first HARQ process.

It should be noted that, in step 401, the first terminal apparatus may stop the first timer when or at a time after the first terminal apparatus determines that the TB transmitted in the first HARQ process is a first TB transmitted for the last time or a newly transmitted TB, or that the quantity of times of transmitting the first TB in the first HARQ process reaches the maximum quantity of transmission times. This is not limited.

Further, optionally, the first terminal apparatus may start a second timer. The second timer is associated with the first HARQ process, and is used to limit a duration of repeatedly transmitting the second TB in the first HARQ process. The second HARQ timer may be the same as or different from a first HARQ timer. Alternatively, the first terminal device may reconfigure the first timer based on scheduling information corresponding to the newly transmitted TB, and restart the first timer. To be specific, the first timer starts to run based on a duration of a timer corresponding to the newly transmitted TB.

Step 402: The first terminal apparatus sends first indication information to the second terminal apparatus.

In an example, when the first terminal apparatus determines that the TB transmitted in the first HARQ process is the first TB transmitted for the last time, and stops the first timer, the first indication information may be used to indicate that the TB transmitted in the first HARQ process is a first TB transmitted for the last time. Alternatively, the first indication information may be further used to instruct the first terminal apparatus to release the first HARQ process, or used to instruct the second terminal apparatus to release a process associated with the first HARQ process, for example, a second HARQ process associated with the first HARQ process, or used to instruct the second terminal apparatus to release a HARQ process associated with the first TB.

In another example, when the first terminal apparatus determines that the TB transmitted in the first HARQ process is the newly transmitted TB, the first indication information may be used to indicate that the TB transmitted in the first HARQ process is a newly transmitted TB.

In this example, before the first terminal apparatus sends the TB to the second terminal apparatus in the first HARQ process, the first terminal apparatus may use sidelink control information (SCI) to carry the first indication information, and send the sidelink control information to the second terminal apparatus. The SCI may be referred to as sidelink feedback control information (SFCI), the SCI may be used to schedule the TB transmitted in the first HARQ, and the SCI may be used to indicate a time-frequency resource location on which the TB is transmitted.

In still another example, when the first terminal apparatus determines that the quantity of times of transmitting the first TB in the first HARQ process reaches the maximum quantity of transmission times, and stops the first timer, the first indication information may be used to indicate that the quantity of times of transmitting the first TB in the first HARQ process reaches the maximum quantity of transmission times.

In this example, before or after completing a last time of sending of the first TB to the second terminal apparatus in the first HARQ process, the first terminal apparatus may use the SCI or other control information to carry the first indication information, and send the SCI or the other control information to the second terminal apparatus. For example, the first indication information may be carried in a first SCI or may be carried in a second SCI, and information included in the first SCI and information included in the second SCI are different and/or have different formats. The first SCI may be used to schedule the first TB sent for the last time. The first SCI is sent before the first TB is sent. The second SCI may be sent after the first SCI is sent or the first TB is sent for the first time. For example, before sending the first TB, the first terminal device first sends the first SCI to the second terminal apparatus. The first SCI carries the first indication information. Alternatively, further optionally, after sending the first SCI to the second terminal apparatus, the first terminal apparatus sends the second SCI. The second SCI carries the first indication information.

In an example, the first indication information is carried in the first SCI. For example, the first indication information may be a bit field in the first SCI, a value of the bit field may be a binary bit quantity "0" or "1", "0" indicates that the maximum quantity of transmission times is not reached, and "1" indicates that the maximum quantity of transmission times is reached. It is assumed that the maximum quantity of transmission times of the first TB is N. When the first terminal apparatus determines that the first TB is transmitted for the $K^{th}$ time, and K<N, a value of the field in the first SCI used to schedule the first TB is "0"; or when the first terminal apparatus determines that the first TB is transmitted for the $N^{th}$ time and the maximum quantity of transmission times is reached, a value of the field in the first SCI is "1".

In another example, each time a SCI used to schedule the first TB is sent, the SCI may further carry the maximum quantity of transmission times of the first TB and/or indication information used to indicate a specific ranking of a first TB that is currently scheduled by the SCI. For example, it is assumed that the first terminal device needs to send the first TB to the second terminal device, and the maximum quantity of transmission times of the first TB is N. When initially transmitting the first TB, the first terminal device indicates the maximum quantity N of transmission times and the bit quantity "1" in SCI corresponding to the initially transmitted first TB. The bit quantity "1" indicates whether transmission is initial transmission or the $1^{st}$ time of transmission. Subsequently, when the first terminal device retransmits the first TB for the $1^{st}$ time, in other words, transmits the first TB for the $2^{nd}$ time, the first terminal device indicates "2" in the retransmitted SCI, and it indicates that current transmission is the $1^{st}$ time of retransmission/the $2^{nd}$ time of transmission of the first TB. In addition, in this example solution, the solution in which the SCI is used to indicate the maximum quantity of transmission times and/or a specific time of transmission of the first TB may not depend on an application scenario in which the first terminal apparatus and the second terminal apparatus maintain a timer in FIG. 4. In other words, the solution in which the SCI is used to indicate the maximum quantity of transmission times and/or the specific time of transmission of the first TB may be used as a solution parallel to the solution of maintaining the timer in FIG. 4, and may be executed independently.

Step 403: The second terminal apparatus receives the first indication information, and stops the second timer based on the first indication information.

The second timer is a timer maintained by the second terminal apparatus, and the second timer may be used to limit a duration in which the second terminal apparatus receives the first TB in the second HARQ process or duration in which the second terminal apparatus uses the second HARQ process to receive the first TB. The duration may be a total duration of sending the first TB in the first HARQ process for a plurality of times. Alternatively, the second timer may be used to limit a duration in which the first TB is received each time. In a running period/an expiration period of the second timer, the second terminal apparatus may receive and process the first TB in the second HARQ process, optionally, and/or feed back an ACK/a NACK corresponding to the first TB. If the second timer expires/stops, the second terminal apparatus stops receiving the first TB in the second HARQ process.

Optionally, the terminal device associates the second HARQ process with the first HARQ or maps the second HARQ process to the first HARQ, or the second HARQ process is associated with the first TB, and the second HARQ process is used to receive the first TB. An identifier (ID) of the second HARQ process may be the same as or different from an ID of the first HARQ process. This is not limited. In this embodiment of this application, an ID of a HARQ process may uniquely identify one HARQ, and the ID of the HARQ process may also be referred to as a HARQ process number.

For example, the second terminal apparatus may receive a SCI from the first terminal apparatus. The SCI may be used to schedule the first TB sent by the first terminal apparatus to the second terminal apparatus. When the SCI includes information used to indicate the ID of the first HARQ process or the ID of the first HARQ process, the second terminal apparatus determines that the first terminal apparatus sends the first TB to the second terminal apparatus in the first HARQ process, and the second terminal apparatus selects an idle process from at least one HARQ process maintained by the second terminal apparatus, for example, the second HARQ process, and receives a first TB scheduled by using the SCI. Further, the second terminal apparatus may store an association relationship between the second HARQ process and the first HARQ process. Subsequently: once the second terminal apparatus determines that the first terminal apparatus sends the first TB to the second terminal apparatus in the first HARQ process, the second terminal apparatus receives the first TB in the second HARQ process based on the association relationship.

Each time before sending the first TB to the second terminal apparatus in the first HARQ process, the first terminal apparatus sends, to the second terminal apparatus. SCI used to schedule a currently sent first TB. The SCI includes the information used to indicate the ID of the first HARQ process or the ID of the first HARQ process, and/or a new transmission indication field. The second terminal apparatus may determine, based on the SCI used to schedule the currently scheduled first TB, that the first terminal apparatus sends the first TB to the second terminal apparatus in the first HARQ process. For example, the first terminal device sends a SCI corresponding to a TB 1 to the second terminal device, and then sends the TB 1 to the second terminal device. Then, the first terminal device sends a SCI corresponding to a TB 2 to the second terminal device, and then sends the TB 2 to the second terminal device. For example, if the second terminal device determines that an identifier of a HARQ process indicated in the SCI corresponding to the TB 2 is the same as an identifier of a HARQ process indicated in the SCI corresponding to the TB 1, and a new transmission indication (NDI) is not toggled, it is considered that the TB 1 and the TB 2 are the same, to be specific, each are the first TB.

For example, that the second terminal apparatus stops the second timer based on the first indication information may include: The second terminal apparatus determines, based on the first indication information, that a TB received by the second terminal apparatus in the second HARQ process associated with the first HARQ process is a first TB transmitted for the last time 30) or is a newly transmitted TB, or that the quantity of times of receiving the first TB in the second HARQ process reaches the maximum quantity of transmission times; and stops the second timer. Alternatively, the second terminal apparatus successfully decodes the first TB, and stops the second timer. Alternatively, the second terminal apparatus generates a HARQ feedback (an ACK or a NACK) of the first TB, and stops the second timer. Alternatively, the second terminal apparatus indicates a HARQ feedback (an ACK or a NACK) of the first TB, and stops the second timer.

That the second terminal apparatus stops the second timer may mean that the second terminal apparatus stops a second timer maintained by the second terminal apparatus/configured in the second terminal apparatus, and stopping the second timer may mean that the second timer expires, receiving of the first TB in the second HARQ process associated with the first HARQ process is stopped, or the first TB is no longer received in the second HARQ process associated with the first HARQ process is stopped.

Alternatively, in the method shown in FIG. 4, after stopping the first timer, the first terminal apparatus may further directly instruct the second terminal apparatus to stop the second timer associated with the second HARQ process, so that the second terminal apparatus directly stops, based on a notification of the first terminal apparatus, the second timer associated with the second HARQ process. The second terminal apparatus can stop the second timer without a need to determine, based on the first indication information, that a TB received in the second HARQ process meets a specific condition (for example, the received TB is a first TB transmitted for the last time, or a quantity of times of receiving the first TB reaches the maximum quantity of transmission times, or the received TB is a newly transmitted TB).

In the method shown in FIG. 4, when the TB sent by the first terminal apparatus in the first HARQ process meets a specific condition, the first terminal apparatus stops a first timer associated with the first HARQ process, and notifies, based on the first indication information, the second terminal apparatus of a case of sending the TB in the first HARQ process, so that the second terminal apparatus learns, based on an indication of the first indication information, of a case in which the first terminal apparatus sends a TB, and stops the second timer in the second terminal apparatus based on the case in which the first terminal apparatus sends a TB. Therefore, a transmit end and a receive end stop, based on a same trigger event, respectively maintained timers associated with a HARQ process. The acts that the transmit end and the receive end stop their respectively maintained timers associated with a HARQ process are aligned, to avoid a problem that the transmit end and the receive end have different stop times of their respectively maintained timers associated with the HARQ process, and consequently, a HARQ of the receive end is locked and cannot be used to transmit another TB, wasting a resource.

In addition to the method shown in FIG. 4, the first terminal apparatus and the second terminal apparatus may further stop their respectively maintained timers based on a quantity of times that TB transmission fails. Specifically, for the method, refer to FIG. 5.

Figure 5:
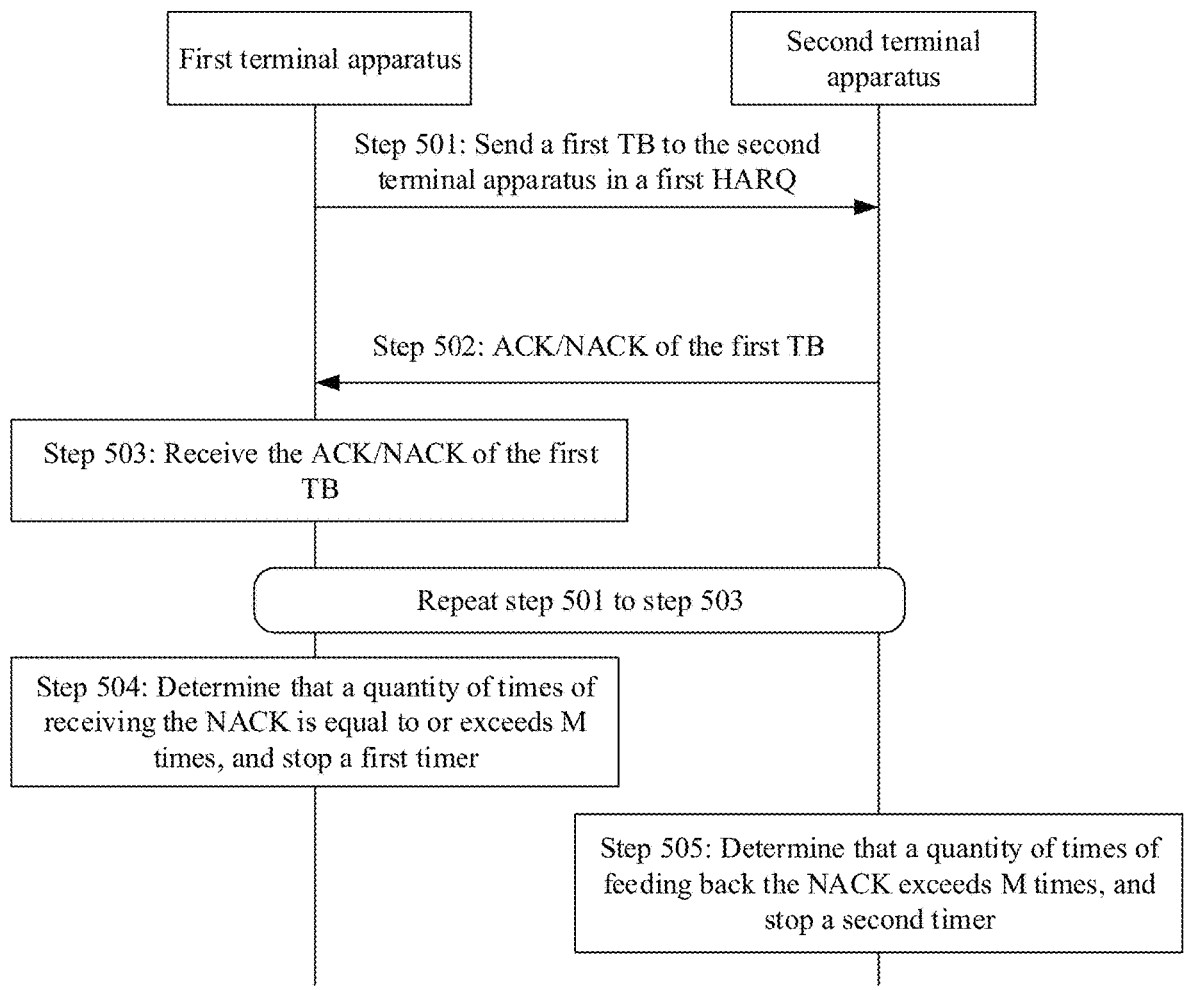
FIG. 5 is a schematic flowchart of controlling a HARQ process according to an embodiment of this application.

FIG. 5 shows another HARQ process control method according to an embodiment of this application. The method may be used to resolve the foregoing technical problem. As shown in FIG. 5, the method may include the following steps.

Step 501: A first terminal apparatus sends a first TB to a second terminal apparatus in a first HARQ process.

Step 502: The second terminal apparatus receives the first TB, processes the first TB, and optionally feeds back an ACK/a NACK of the first TB to the first terminal apparatus.

Step 503: Optionally, the first terminal apparatus receives the ACK/NACK corresponding to the first TB.

Before a quantity of transmission times of the first TB reaches a maximum quantity of transmission times, the first terminal apparatus optionally repeatedly performs step 501, step 503, and step 504, and the first terminal apparatus repeatedly performs step 502 to step 505.

Step 504: Optionally, the first terminal apparatus determines that a quantity of times of receiving the NACK is equal to or exceeds M times, and stops a first timer.

M is an integer greater than or equal to 1, and the NACK may be used to indicate that the second terminal apparatus does not correctly receive a first TB transmitted in the first HARQ process. M may be configured by the first terminal apparatus and configured by the first terminal apparatus for the second terminal apparatus/notified by the first terminal apparatus to the second terminal apparatus.

When a quantity of NACKs is equal to or exceeds M, it indicates that there is a too large quantity of times that transmission of the first TB in the first HARQ process fails, and it may be unsuitable to transmit the first TB in the first HARQ process. Therefore, a first timer associated with/corresponding to the first HARQ process is stopped.

Step 505: Optionally; the second terminal apparatus determines that a quantity of times of feeding back the NACK exceeds M times, and stops the second timer.

In the method shown in FIG. 5, the first terminal apparatus may stop the first timer when a quantity of NACKs corresponding to the first TB reaches a specific value, and the second terminal apparatus may stop the second timer when the quantity of NACKs corresponding to the first TB reaches the specific value. Therefore, a transmit end and a receive end stop, based on the quantity of NACKs, respectively maintained timers associated with a HARQ process. The acts that the transmit end and the receive end stop their respectively maintained timers associated with a HARQ process are aligned, to avoid a problem that the transmit end and the receive end have different stop times of their respectively maintained timers associated with the HARQ process, and consequently, a HARQ of the receive end is locked and cannot be used to transmit another TB, wasting a resource.

The acts of the first terminal apparatus stopping the first timer associated with the first HARQ process and the second terminal apparatus stopping a second timer associated with a second HARQ process are described in step 401 to step 403 or step 501 to step 505. In addition, this embodiment of this application further relates to another act that the first terminal apparatus maintains the first timer, for example, an act after the first terminal apparatus stops the first timer, an act of configuring the first timer, an act of starting/restarting the first timer, and an act of the first terminal apparatus in a running period of the first timer. Specifically, the acts may be described with reference to the following first implementation to the fourth implementation:

The first implementation relates to the act after the first terminal apparatus stops the first timer:

Further, when or after the first terminal apparatus stops the first timer, the first terminal apparatus may further perform the following process: The first terminal apparatus releases the first HARQ process, and/or the first terminal apparatus sends a release notification to a network device.

It should be noted that, in this embodiment of this application, "when an event occurs" may be "while the event occurs", or may be "after the event occurs", for example, a specific preset time after the event occurs. This is not limited. For example, "when the first timer expires" may include: "while the first timer expires", "after the first timer expires", or a specific time after the first timer expires. This is not limited. For another example, "when the new transmission indication is received" in this application may include "while the new transmission indication is received" or "after the new transmission indication is received". This is not limited.

The release notification may be used to instruct the network device to release the first HARQ, or used to instruct the network device to release a sidelink transmission resource used to transmit the first TB, or used to notify the network device that the first HARQ process is available. The first TB may be a TB transmitted in the first HARQ process. It should be noted that the first terminal apparatus may send the release notification to the network device in Mode 1 or Mode 2. This is not limited. The first terminal device may send the release notification to the network device by triggering connection establishment or link re-establishment.

That the first terminal apparatus releases the first HARQ process may also be referred to as that the first terminal apparatus unlocks the first HARQ process, stops transmitting the first TB in the first HARQ, sets the first HARQ process to be in an idle state, or allows transmission of another TB in the first HARQ process. It should be noted that, the first terminal apparatus may release the first HARQ process in Mode 1 or Mode 2. This is not limited.

Further, the first terminal apparatus may further clear a buffer associated with the first HARQ process in the first terminal apparatus, or use new data, a TB, or a MAC PDU to overwrite a buffer associated with the first HARQ process.

It should be noted that, the acts described in the first implementation are further applicable to a scenario in which the first timer expires. To be specific, after the first timer expires, the first terminal apparatus may release the first HARQ process as described in the first implementation, and/or send the release notification to the network device.

Based on the first implementation, after stopping the first timer, the first terminal apparatus may release, in a timely manner, the sidelink transmission resource corresponding to the first TB transmitted in the first HARQ process, to avoid wasting a resource.

The second implementation relates to how to configure the first timer associated with the first HARQ. For example, the first timer associated with the first HARQ in the first terminal apparatus and a related parameter of the first timer may be configured in Manner (1.1) or Manner (1.2). The related parameter of the first timer may include at least a duration of the first timer, and may further include an event that triggers a start/restart of the first timer, an event that triggers a stop of the first timer, or the like:

Manner (1.1): The first terminal apparatus configures the first timer and the duration of the first timer.

The duration of the first timer may be determined based on a quantity of times of transmitting the first TB in the first HARQ process, or may be determined based on a related parameter of an LCH multiplexed for the first TB.

For example, the duration of the first timer is determined based on the related parameter of the LCH multiplexed for the first TB. The first parameter is preconfigured or is configured by the network device for each LCH. For example, when the network device configures an LCH or an RB for the first terminal device by using dedicated signaling or a system message, a first parameter used to determine the duration of the first timer is provided in a configuration. In other words, the first parameter is used to indicate a duration of a timer associated with the LCH, and the LCH may also be replaced with a radio bearer (RB). Data on one or more logical channels LCHs is multiplexed for the first TB, and the duration of the first timer may be equal to a first parameter corresponding to an LCH with a highest priority in the one or more LCHs, or the duration of the first timer is equal to a first parameter with a smallest value in a first parameter corresponding to the one or more LCHs.

The first parameter corresponding to the LCH may be a duration of the timer associated with the LCH, and a configuration of the first parameter corresponding to the LCH is a preconfigured parameter or is configured by the network device. For example, when the network device establishes a radio resource control (RRC) connection to the first terminal apparatus, the first parameter corresponding to the LCH may be preconfigured by the network device for the first terminal apparatus through RRC signaling. Alternatively, after the network device establishes an RRC connection to the first terminal apparatus, the first parameter corresponding to the LCH may be configured by the network device for the first terminal apparatus through dynamic signaling or physical layer signaling or by using system information (for example, a system information block (SIBs)). This is not limited.

Manner (1.2): The first timer and the duration of the first timer are preconfigured parameters or are configured by the network device.

In Manner (1.2), the network device may determine the duration of the first timer based on a maximum quantity of transmission times of the first TB. When the network device establishes an RRC connection to the first terminal apparatus, the network device may preconfigure the first timer and the duration of the first timer for the first terminal apparatus through RRC signaling. Alternatively, after the network device establishes an RRC connection to the first terminal apparatus, the network device may preconfigure the first timer and the duration of the first timer for the first terminal apparatus through dynamic signaling or physical layer signaling or by using system information. This is not limited.

In the second implementation, the first terminal apparatus may configure the first timer, or the network device may configure the first timer in the first terminal apparatus.

The third implementation relates to a specific condition in which the first terminal apparatus starts/restarts the first timer. Specifically, the first terminal apparatus may start/restart the first timer upon triggering by any one of Event 1 to Event 5:

Event 1: The first terminal apparatus receives the new transmission indication, and starts or restarts the first timer.

The new transmission indication may be used to instruct the first terminal apparatus to newly transmit the first TB in the first HARQ process, or the new transmission indication may be used to instruct the first terminal apparatus to transmit the first TB in the first HARQ process: or the new transmission indication may be used to instruct the first terminal apparatus to start transmitting the first TB in the first HARQ process.

The new transmission indication may be carried in DCI or a media access control control element (MAC CE). For example, the network device may use the DCI to carry the new transmission indication, and send the DCI to the first terminal apparatus, or after a MAC of the first terminal apparatus generates the first TB, it is indicated that transmission of the first TB at a physical layer is a new transmission. In this embodiment of this application, starting the first timer may alternatively be described as restarting the first timer. Starting the first timer may be: enabling the first timer to start operating, and starting timing from 0, until the first timer is forcibly stopped or a timing duration of the first timer reaches the duration of the first timer, in other words, the first timer expires and timing is stopped: or until the first timer is restarted.

Event 2: The first terminal apparatus receives a NACK sent by the second terminal apparatus, and starts or restarts the first timer.

The NACK is used to indicate that the second terminal apparatus does not correctly receive the first TB or that the second terminal apparatus does not successfully decode the first TB. It should be noted that, in this embodiment of this application, that the second terminal apparatus does not correctly receive the first TB may mean that the second terminal apparatus does not successfully decode or receive the first TB.

The NACK in Event 2 may be the 1st NACK sent by the second terminal apparatus, or may be the $X^{th}$ NACK, and X is an integer greater than or equal to 2. This is not limited.

It can be understood that, optionally, in a mechanism of feeding back only the ACK, Event 2 may alternatively be replaced with the following: If the first terminal apparatus does not receive an ACK fed back by the second terminal apparatus, the first timer is started or restarted.

Event 3: The first terminal apparatus determines to retransmit the first TB to the second terminal apparatus in the first HARQ process, and starts or restarts the first timer.

Event 3 may be replaced with the following: The first timer is started or restarted after the first terminal apparatus indicates to the second HARQ process to trigger retransmission: or the first timer is started or restarted after the first terminal apparatus obtains a MAC PDU from a multiplexing and assembly entity: or the first terminal apparatus receives a retransmission resource scheduled by the network device, and starts or restarts the first timer.

For example, if the first terminal apparatus receives a NACK fed back by the second terminal apparatus, the first terminal apparatus determines to retransmit the first TB: or in a mechanism of feeding back only an ACK, if the first terminal apparatus does not receive an ACK fed back by the second terminal apparatus, the first terminal apparatus determines to retransmit the first TB.

Event 4: The first terminal apparatus receives a restart indication from the network device, and starts the first timer based on the restart indication.

The restart indication may be used to indicate to restart the first timer.

For example, after receiving a sidelink resource that is sent by the first terminal apparatus and that is used to request to transmit the first TB, the network device may send the restart indication to the first terminal apparatus when allocating the sidelink resource to the first terminal apparatus.

Event 5: A first terminal sends an ACK feedback or a NACK feedback to the network device, and starts or restarts the first timer.

The ACK or the NACK corresponds to an ACK or a NACK received by the first terminal device from the second terminal device, or corresponds to a feedback existing when no NACK or ACK fed back by the second terminal device is received. For example, when the second terminal device feeds back only the NACK, if the first terminal device does not receive the NACK fed back by the second terminal device, the first terminal device feeds back the ACK to the network device.

Event 5 may be replaced with the following: The first terminal generates an ACK feedback or a NACK feedback to be sent to the network device, and starts or restarts the first timer.

For example, if the first terminal apparatus receives the NACK fed back by the second terminal apparatus, the first terminal apparatus determines that the first TB needs to be retransmitted, and feeds back the NACK to the network device to request a retransmission resource. Alternatively, in a mechanism of feeding back only an ACK, if the first terminal apparatus does not receive the ACK fed back by the second terminal apparatus, the first terminal apparatus determines that the first TB needs to be retransmitted, and feeds back the NACK to the network device, to request a retransmission resource.

The fourth implementation relates to the behavior of the first terminal apparatus in the running period of the first timer. The behavior specifically includes the following content.

If the first timer does not expire and/or the quantity of times of transmitting the first TB does not reach the maximum quantity of transmission times, and the second terminal apparatus does not correctly receive the first TB and/or a resource used to transmit the first TB is less than a preset threshold, and/or no resource is reserved and/or no repetition resource remains (namely, available) if a repetition is configured, the first terminal apparatus obtains the resource used to transmit the first TB: or if the first timer does not expire, the quantity of times of transmitting the first TB does not reach the maximum quantity of transmission times, and the resource used to transmit the first TB is less than a preset threshold, the first terminal apparatus obtains a new resource used to transmit the first TB.

The resource used to transmit the first TB may be a sidelink resource used to transmit the first TB or a sidelink transmission resource of the first TB.

The preset threshold may be set based on a requirement. This is not limited. If the resource used to transmit the first TB is less than the preset threshold, it indicates that an available sidelink resource is insufficient to transmit all first TBs, and more sidelink resources are required to transmit the first TB. On the contrary, if the resource used to transmit the first TB is greater than or equal to the preset threshold, it indicates that there is a sidelink resource that can be used to transmit all the first TBs.

The first terminal apparatus may obtain, in Mode 1 or Mode 2, a resource for transmitting the first TB or a sidelink resource for transmitting the first TB. For example, that the first terminal apparatus obtains a new resource used to transmit the first TB may include: The first terminal apparatus obtains, from the network device, the resource used to transmit the first TB: or the first terminal apparatus independently selects the resource used to transmit the first TB.

For a case in which a HARQ feedback is not supported, for example, a case of sidelink broadcast communication, or a case in which a HARQ feedback is supported but is disabled, for example, a case in which a HARQ feedback is disabled in sidelink multicast/unicast communication, each time after the first terminal device transmits the first TB, the first terminal device determines, based on the foregoing condition, whether the resource used to transmit the first TB needs to be obtained, in other words, whether a resource needs to be reserved or whether a resource needs to be requested from a base station.

For a case in which a HARQ feedback is supported and the HARQ feedback is enabled, for example, a case in which a HARQ feedback is enabled in sidelink multicast unicast communication, when a HARQ feedback that is sent by the second terminal device and that is received by the first terminal device is a NACK, the first terminal device may determine, based on the foregoing condition, whether the resource used to transmit the first TB needs to be obtained, in other words, whether a resource needs to be reserved or whether a resource needs to be requested from a base station.

In the fourth implementation, in the running period of a timer and/or when the quantity of transmission times of the first TB does not reach the maximum quantity of transmission times, but the resource used to transmit the first TB is insufficient, the first terminal apparatus may request a new sidelink resource used to transmit the first TB, or trigger resource reselection to select a resource from a resource pool that is preconfigured or that is configured by the network device, to ensure normal transmission of the first TB.

It should be noted that, in this embodiment of this application, the buffer associated with the first HARQ process is not only cleared after the first timer expires, but also may be cleared when the first TB is successfully sent or in another case. Details are as follows:

After the first terminal apparatus receives an ACK fed back by the second terminal apparatus, or receives a new transmission indication from the network device, or successfully sends, to the second terminal apparatus in the first HARQ process, the first TB transmitted for the last time, the first terminal apparatus clears the buffer associated with the first HARQ process: or uses a second TB to overwrite the buffer associated with the first HARQ process.

The ACK is used to indicate that the second terminal apparatus correctly receives the first TB transmitted by the first terminal apparatus in the first HARQ process. The new transmission indication is used to instruct the first terminal apparatus to transmit a new TB in the first HARQ process.

Further, after clearing the buffer associated with the first HARQ process, the first terminal apparatus sends the second TB in the first HARQ process, and stores the second TB in the buffer associated with the first HARQ, to facilitate subsequent retransmission of the second TB.

The foregoing describes another situation where the first terminal apparatus maintains the first timer. In addition, this embodiment of this application further relates to a situation where the second terminal apparatus maintains the second timer, for example, an act of configuring the second timer, an act of starting/restarting the second timer, an act of the second terminal apparatus in a running period of the second timer, and an act after the second timer is stopped. Specifically, for the acts, refer to the fifth implementation and the sixth implementation:

The fifth implementation relates to how to configure the second timer associated with the second HARQ. Specifically, the second timer in the second terminal apparatus and a related parameter of the second timer may be configured in Manner (2.1) or Manner (2.2), and the related parameter of the second timer may include at least a duration of the second timer, and may further include an event that triggers a start/restart of the second timer, an event that triggers a stop of the second timer, or the like:

Manner (2.1): The first terminal apparatus configures the second timer for the second terminal apparatus.

For example, the first terminal apparatus may configure the second timer for the second terminal apparatus based on a parameter such as the duration of the first timer. Specifically, the first terminal apparatus may configure the first timer and the duration of the first timer for the second terminal apparatus by using SCI. For example, the first terminal apparatus may use the SCI to carry indication information used to instruct the second terminal apparatus to configure the second timer and a related parameter of the first timer, and send the SCI to the second terminal apparatus.

Alternatively, the first terminal indicates a duration configuration of the second timer in SCI that is used to transmit the first TB each time, and a same or different duration of a timer may be indicated in each SCI. In other words, the duration of the second timer that is indicated in the SCI is the remaining time for transmitting the first TB, or a remaining running time of the first timer. For example, the duration of the first timer associated with the first HARQ process corresponding to the first TB transmitted by the first terminal device is 10 ms. When the first terminal device is to transmit the first TB for the $Q^{th}$ time, and Q is an integer greater than or equal to 1, the first timer has run for 5 ms, in other words, the remaining running time is 5 ms, the first terminal device sets a duration parameter of the second timer to 5 ms in the SCI used to transmit the first TB for the $Q^{th}$ time. After receiving the SCI, the second terminal device resets the duration of the second timer to 5 ms, and restarts the second timer.

For a manner of determining the duration of the first timer, refer to description in Manner (1.1). Details are not described again. The duration of the second timer may be the same as or different from the duration of the first timer. This is not limited.

Manner (2.2): The second timer and the duration of the second timer are preconfigured parameters or are configured by the network device.

In Manner (2.2), the network device may determine the duration of the second timer based on the maximum quantity of transmission times of the first TB.

In Manner (2.2), the first terminal apparatus and the second terminal apparatus are located in a coverage area of the network device. When the network device establishes an RRC connection to the second terminal apparatus, the network device may preconfigure the second timer and the duration of the second timer for the second terminal apparatus through RRC signaling. Alternatively, after the network device establishes an RRC connection to the second terminal apparatus, the network device may preconfigure the second timer and the duration of the second timer for the second terminal apparatus through dynamic signaling or physical layer signaling or by using system information. This is not limited.

Manner (2.3): The second terminal apparatus configures the second timer and the duration of the second timer.

For example, the second terminal apparatus may determine the duration of the second timer based on the maximum quantity of transmission times of the first TB, or may determine the duration of the second timer based on a related parameter of QoS (for example, a PDB) multiplexed for the first TB. This is not limited. Specifically, for this determining manner, refer to description in Manner (1.1).

In the fifth implementation, the first terminal apparatus may configure the second timer, and notify the second terminal apparatus of the duration of the second timer, or the network device may centrally configure the second timer in the second terminal apparatus, so that second timers in the first terminal apparatus and the second terminal apparatus have same duration or another related parameter, to ensure that the first terminal apparatus and the second terminal apparatus have the same second timers.

The sixth implementation relates to a specific condition in which the second terminal apparatus starts/restarts the second timer. Specifically, the second terminal apparatus may start/restart the second timer upon triggering by Event 5 or Event 6:

Event 5: The second terminal apparatus receives configuration information, and reconfigures and/or starts or restarts the second timer based on the configuration information.

The configuration information may be used to instruct the second terminal apparatus to start a second timer corresponding to a second HARQ process associated with the first HARQ process: or used to indicate that the first terminal apparatus has started a first timer associated with the first HARQ process: or used to instruct the first terminal apparatus to start transmitting the first TB to the second terminal apparatus in the first HARQ process: or used to indicate to configure or reconfigure the second timer. The configuration information may be sent by the first terminal apparatus to the second terminal apparatus after the first terminal apparatus starts the first timer based on any one of Event 1 to Event 3.

Event 5 may be replaced with the following: A second terminal apparatus receives a new transmission indication sent by a first terminal apparatus, and starts or restarts and/or reconfigures a timer: or the second terminal apparatus instructs the physical layer to generate a negative acknowledgment feedback (for example, a NACK) for data of the first TB, and starts or restarts and/or reconfigures a timer: or the second terminal apparatus sends a non-acknowledgment feedback (for example, a NACK) corresponding to the first TB, and starts or restarts and/or reconfigures a timer: or the second terminal apparatus instructs the physical layer to combine received data and data in the buffer, or instructs the physical layer to decode the first TB; and starts or restarts and/or reconfigures a timer.

Event 6: The second terminal apparatus receives a restart indication from the network device, and starts the second timer based on the restart indication.

The restart indication is described in Event 4. It should be noted that, in this embodiment of this application, the network device may simultaneously send the restart indication to the first terminal apparatus and the second terminal apparatus.

In the third implementation, after starting/restarting the second timer, the first terminal apparatus may instruct the second terminal apparatus to start/restart the second timer, or the network device may centrally instruct the first terminal apparatus and the second terminal apparatus to start/restart the second timer, so that the first terminal apparatus and the second terminal apparatus align times for starting/restarting the second timer.

The seventh implementation relates to an action of the second terminal apparatus in a running period of the second timer. The action specifically includes the following content.

In a running period of the second timer, optionally, the second terminal apparatus feeds back feedback information corresponding to the first TB to the first terminal apparatus, and the feedback information includes an ACK or a NACK. In other words, before sending/or indicating or generating the feedback information corresponding to the first TB, the second terminal apparatus needs to determine whether the second timer is running; and if the second timer is running, the second terminal apparatus performs the foregoing operation, to be specific, sends/or indicates or generates the feedback information corresponding to the first TB: or if the second timer is not running, the second terminal apparatus does not generate/indicate/send the feedback information corresponding to the first TB.

In a running period of the second timer, the second terminal apparatus performs combination processing on a TB in a buffer associated with the second HARQ process. In other words, when sending/or indicating or generating feedback information corresponding to the first TB, the second terminal apparatus needs to determine whether the second timer is running, and if the second timer is running, the second terminal apparatus performs the foregoing operation, to be specific, performs combination processing on the TB in the buffer associated with the second HARQ process, and sends/or indicates or generates the feedback information corresponding to the first TB: or if the second timer is not running, the second terminal apparatus does not generate/indicate/send the feedback information corresponding to the first TB.

In the seventh implementation, in the running period of the second timer, the second terminal apparatus may normally feed back an ACK/a NACK corresponding to the first TB, or perform combination processing on the first TB in the buffer associated with the second HARQ process, to improve transmission reliability of the first TB.

The eighth implementation relates to an action of the second terminal apparatus after the second terminal apparatus stops the second timer. The action specifically includes: The second terminal apparatus clears a buffer associated with the second HARQ process, or uses new data or a TB to overwrite a buffer associated with the second HARQ process, and stops receiving the first TB in the second HARQ process/releases the second HARQ process.

Further, the second terminal apparatus may receive another TB, for example, the second TB, in the second HARQ process.

That the second terminal apparatus clears the buffer associated with the second HARQ process may mean that the second terminal apparatus deletes/clears, from the buffer in the running period of the second timer, the TB in the buffer associated with the second HARQ process. That the second terminal apparatus clears the buffer associated with the second HARQ process may be replaced with the following: The second terminal apparatus overwrites the buffer associated with the second HARQ process. For example, after the second timer expires, the second terminal apparatus does not clear the buffer associated with the second HARQ process. Instead, when the second terminal apparatus receives another new TB, for example, the second TB, in the first HARQ process, the second terminal apparatus uses a received second TB to overwrite/replace/update the TB in the buffer associated with the second HARQ process.

In the eighth implementation, after stopping the second timer, the second terminal apparatus clears, in a timely manner, the buffer associated with the second HARQ process, and releases storage space associated with the second HARQ process, to improve utilization of the storage space.

The ninth implementation relates to how the first terminal apparatus and the second terminal apparatus aligns a quantity of transmission times of the first TB. Details are as follows: The first terminal apparatus indicates, to the second terminal device in the SCI, a specific time of a current transmission of the first TB corresponding to the SCI. Optionally, the SCI includes the maximum quantity of transmission times of the first TB.

In the ninth implementation, the SCI may be replaced with another signaling, for example, a PC5 RRC message.

For example, it is assumed that the first terminal device needs to send the first TB to the second terminal device, and the maximum quantity of transmissions times of the first TB is N. When initially transmitting the first TB, the first terminal device indicates the maximum quantity N of transmission times in SCI corresponding to the initially transmitted first TB (or SCI used to schedule the initially transmitted first TB), and indicates whether initial transmission or the $1^{st}$ time of transmission is performed. Subsequently, when retransmitting the first TB for the first time, the first terminal device indicates "2" in a retransmission SCI, to indicate that the $1^{st}$ time of retransmission/the $2^{nd}$ time of transmission of the first TB is performed currently.

It should be noted that the acts described in the first implementation to the ninth implementation may be applicable to the method shown in FIG. 4 or FIG. 5. Details are not described.

In addition, for the second terminal apparatus side, in this embodiment of this application, in addition to clearing the buffer associated with the second HARQ process and releasing the second HARQ process after the second timer expires, after the second terminal apparatus successfully parses (decodes) the first TB or receives an indication indicating that a newly transmitted TB is received, the second terminal apparatus clears the buffer associated with the second HARQ process, and releases the second HARQ process. Specifically, the process is shown in FIG. 6.

Figure 6:
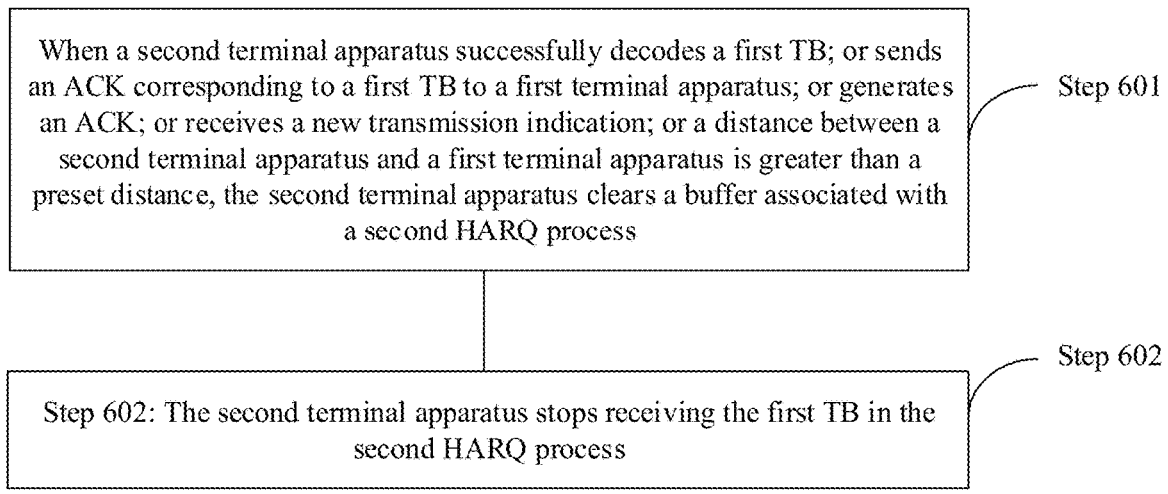
FIG. 6 is a schematic flowchart of controlling a HARQ process according to an embodiment of this application.

FIG. 6 is still another HARQ process control method according to an embodiment of this application. The method may include the following steps.

Step 601: When a second terminal apparatus successfully decodes a first TB transmitted by a first terminal apparatus in a first HARQ process: or sends an ACK corresponding to a first TB to a first terminal apparatus: or generates an ACK to be sent to a first terminal apparatus: or determines that decoding is successful: or if only a NACK needs to be fed back, determines to feed back an ACK: or receives a new transmission indication from a first terminal apparatus: or receives a new transmission indication from the first terminal apparatus for a HARQ process corresponding to a first TB: or a distance between a second terminal apparatus and a first terminal apparatus is greater than a preset distance, the second terminal apparatus clears a buffer associated with a second HARQ process.

Related description of the new transmission indication is described above. Details are not described.

The preset distance may be set based on a requirement. When the distance between the second terminal apparatus and the first terminal apparatus is greater than the preset distance, it indicates that the second terminal apparatus and the first terminal apparatus are relatively far away from each other, and communication between the second terminal apparatus and the first terminal apparatus may be interrupted: or because the distance is long, a TB cannot be successfully transmitted or a HARQ feedback is not supported/not required to be transmitted.

That the second terminal clears the buffer associated with the second HARQ process may mean that the second terminal apparatus deletes/clears, from the buffer in a running period of a second timer, a TB in the buffer associated with the second HARQ process. That the second terminal apparatus clears the buffer associated with the second HARQ process may be replaced with the following: The second terminal apparatus overwrites the buffer associated with the second HARQ process. For example, after the second timer expires, the second terminal apparatus does not clear the buffer associated with the second HARQ process.

Instead, when the second terminal apparatus receives another new TB, for example, a second TB, in the first HARQ process, the second terminal apparatus uses the received second TB to overwrite/replace/update the TB in the buffer associated with the second HARQ process.

Step 602: The second terminal apparatus stops receiving the first TB in the second HARQ process.

That the second terminal apparatus stops receiving the first TB in the first HARQ process may also be referred to as that the second terminal apparatus unlocks or releases the first HARQ process, so that the first HARQ process is in an idle state or a new TB is received in the first HARQ process. For example, further, the second terminal apparatus receives the second TB in the first HARQ process.

Figure 7:
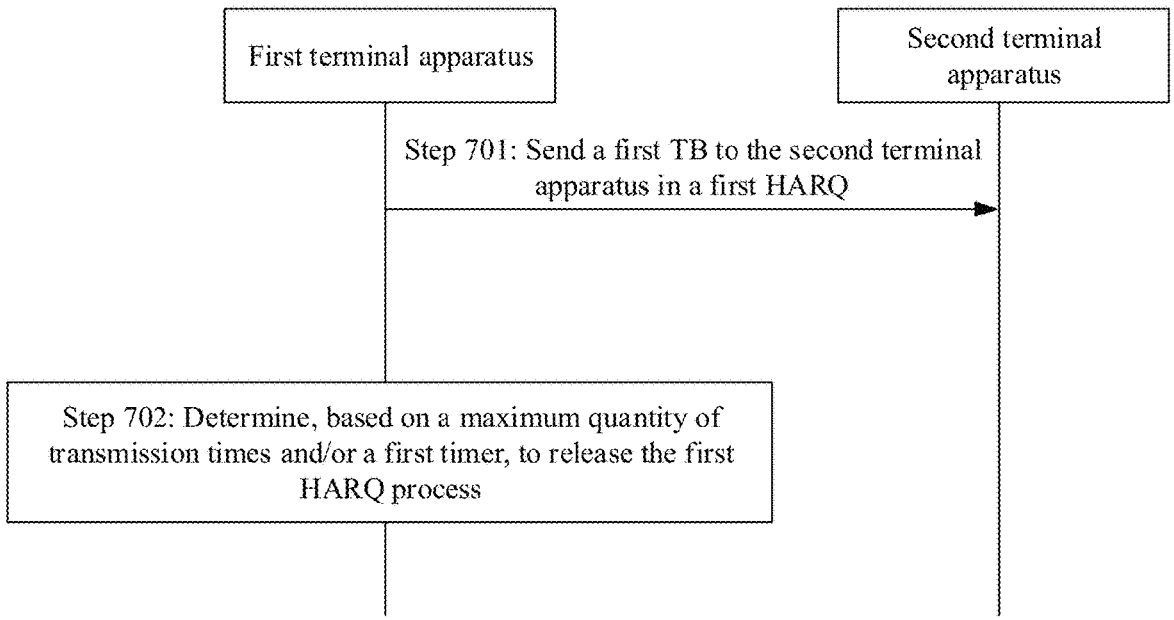
FIG. 7 is a schematic flowchart of controlling a HARQ process according to an embodiment of this application.

It should be noted that, in a method shown in FIG. 7, a sequence in which the second terminal apparatus clears the buffer of the second HARQ process and the second terminal apparatus stops receiving the first TB in the second HARQ process is not limited. The second terminal apparatus may clear the buffer of the second HARQ process, and then stop receiving the first TB in the second HARQ process: or may stop receiving the first TB in the second HARQ process, and then clear the buffer associated with the second HARQ process: or may simultaneously clear the buffer of the second HARQ process, and stop receiving the first TB in the second HARQ process. This is not limited.

In the method in FIG. 6, when the second terminal apparatus successfully decodes the first TB received by the second terminal apparatus in the second HARQ process: or sends the ACK corresponding to the first TB to the first terminal apparatus: or generates the ACK to be sent to the first terminal apparatus: or receives the new transmission indication from the first terminal apparatus: or the distance between the second terminal apparatus and the first terminal apparatus is greater than the preset distance, the second terminal apparatus may clear the buffer associated with the second HARQ process, and store another new TB in the buffer associated with the second HARQ process. Therefore, a buffer associated with a HARQ process in which a TB is successfully transmitted or that is inconducive to transmit a TB may be cleared in a timely manner, to improve a storage capability of the second terminal apparatus.

It should be noted that, in the manner shown in FIG. 6, the second HARQ process maintained by the second terminal apparatus may be correspondingly configured with the second timer. A related description of the second timer is described above. For a behavior of maintaining the second timer by the second terminal apparatus, for example, a behavior of restarting/starting the second timer, a behavior in a running period of the second timer, and a behavior after the timer expires, refer to the foregoing description. Details are not described.

In addition, an existing operation of stopping a timer based on the timer or a maximum quantity of transmission times cannot meet a quality of service (QOS) requirement of TB transmission, for example, cannot meet a reliability requirement of a TB.

For example, transmission of a TB in a HARQ process can be stopped only when or after a quantity of times of transmitting the TB in the HARQ process reaches the maximum quantity of transmission times, but if a delay requirement of the TB has been exceeded when the quantity of times of transmitting the TB in the HARQ process does not reach the maximum quantity of transmission times, transmission quality of the TB is affected. For example, in Mode 2, transmit-end UE needs to reserve a sidelink resource for repeated transmission of a TB 1, and after all sidelink resources that are reserved for the $1^{st}$ time are used, a sidelink resource needs to be reserved again for the $2^{nd}$ time. If a time interval between the two times of reservation is long and exceeds a delay requirement of the TB, a TB transmission delay is affected, and a QoS requirement of TB transmission cannot be met.

Alternatively, a sidelink resource that is allocated by a network device to the transmit-end UE and that is used to transmit a TB is robust, and a quantity of times of transmitting a TB in the HARQ process has reached the maximum quantity of transmission times. However, because the timer does not expire, the HARQ process continues to be locked until the timer expires. Therefore, when transmission of a TB in a HARQ process associated with the timer is stopped, because the HARQ process is in an occupied state for a long period of time, the HARQ process cannot be used to transmit another new TB, and a resource is wasted.

To resolve a problem that a QoS requirement of TB transmission cannot be met in the conventional technology, an embodiment of this application further provides a HARQ process control method. FIG. 7 shows yet another HARQ process control method according to an embodiment of this application. The method may include the following steps.

Step 701: A first terminal apparatus transmits a first TB to a second terminal apparatus in a first HARQ process.

For related description of the first HARQ process, refer to the description in step 401. Details are not described again.

For example, that the first terminal apparatus transmits the first TB to the second terminal apparatus in the first HARQ process may include: After the first terminal apparatus generates/obtains data on a plurality of LCHs, the data on the plurality of LCHs is multiplexed into the first TB, the first TB is processed in the first HARQ process, and the processed first TB is sent to the second terminal apparatus on a sidelink resource.

Step 702: The first terminal device determines, based on a maximum quantity of transmission times and/or a first timer, to release the first HARQ process.

The first timer is associated with the first HARQ process. For related description of the maximum quantity of transmission times and the first timer, refer to the description in step 401. Details are not described again.

In an example, that the first terminal device determines, based on the maximum quantity of transmission times and the first timer, to release the first HARQ process may include: When the quantity of times of transmitting the first TB in the first HARQ process is less than the maximum quantity of transmission times, and the first timer expires/stops, the first terminal apparatus determines to release the first HARQ process.

In another example, that the first terminal device determines, based on the maximum quantity of transmission times and the first timer, to release the first HARQ process may include: When the quantity of times of transmitting the first TB in the first HARQ process is equal to or exceeds the maximum quantity of transmission times, the first terminal apparatus determines to release the first HARQ process.

Optionally, after step 702, the method further includes:

The first terminal apparatus notifies the second terminal apparatus that the first timer expires/stops, or that the quantity of times of transmitting the first TB in the first HARQ process is equal to or exceeds the maximum quantity of transmission times, or that the first HARQ process is released.

Further, after step 702, the method further includes: The first terminal apparatus stops the first timer.

In the method shown in FIG. 7, after the first terminal apparatus stops the first timer, the first terminal apparatus may release the first HARQ process with reference to the first implementation. Details are not described again.

In the method shown in FIG. 7, the first timer in the first terminal apparatus may be configured with reference to the second implementation. Details are not described.

In the method shown in FIG. 7, the first terminal apparatus may start/restart the first timer with reference to the third implementation. Details are not described.

In the method shown in FIG. 7, for an execution action of the first terminal apparatus in a running period of the first timer, refer to the description in the fourth implementation. Details are not described again.

In the method shown in FIG. 7, the first terminal apparatus may comprehensively consider a timer and a maximum quantity of transmission times of a TB, determine, based on the timer and the maximum quantity of transmission times of the TB, whether to release the first HARQ process, and stop a first timer associated with the first HARQ, so that a transmit end does not determine, based on only the timer or the maximum quantity of transmission times of the TB, to release the first HARQ process, to improve a transmission requirement of the TB.

The foregoing mainly describes the solutions provided in embodiments of this application from a perspective of interaction between network elements. It can be understood that, to implement the foregoing functions, each network element, for example, the first terminal apparatus and the second terminal apparatus, includes a corresponding hardware structure and/or software module for executing each function. A person skilled in the art should be easily aware that algorithms and steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, the first terminal apparatus and the second terminal apparatus may be divided into functional modules based on the foregoing method examples. For example, each functional module may be obtained through division for each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

Figure 8:
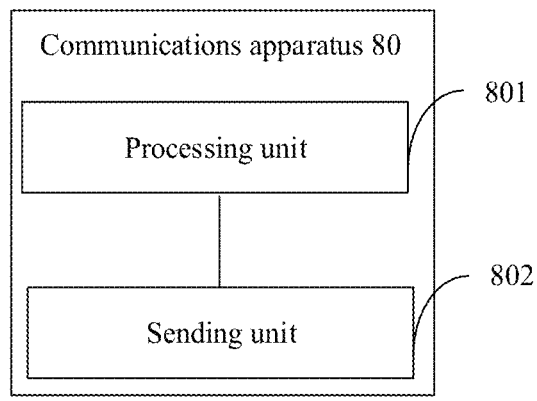
FIG. 8 is a schematic diagram of a composition of a communications apparatus 80 according to an embodiment of this application.

FIG. 8 is a diagram of a structure of a communications apparatus 80. The communications apparatus 80 may be a first terminal apparatus, a chip in the first terminal apparatus, or a system on chip. The communications apparatus 80 may be configured to perform a function of a terminal in the foregoing embodiments. The communications apparatus 80 shown in FIG. 8 may include a processing unit 801 and a sending unit 802.

In an example, the processing unit 801 is configured to: determine that a TB transmitted in a first HARQ process is a first TB transmitted for the last time and a newly transmitted TB, or that a quantity of times of transmitting a first TB in a first HARQ process reaches a maximum quantity of transmission times; and stop a first timer. For example, the processing unit 801 may support the communications apparatus 80 in performing step 401.

The sending unit 802 is configured to send first indication information to a second terminal apparatus. The first indication information is used to indicate that the transport block TB transmitted in the first HARQ process is a first TB transmitted for the last time or a newly transmitted TB, or is used to indicate that the quantity of times of transmitting the first TB in the first HARQ process reaches the maximum quantity of transmission times. For example, the sending unit 802 may be configured to instruct the communications apparatus 80 to perform step 402.

In another example, the processing unit 801 is configured to: determine that a quantity of times of receiving a negative acknowledgment NACK is equal to or exceeds M times, and stop a first timer. For example, the processing unit 801 may support the communications apparatus 80 in performing step 504.

In still another example, the sending unit 802 is configured to transmit the first TB to a second terminal apparatus in the first HARQ process. For example, the sending unit 802 may support the communications apparatus 80 in performing step 701.

The processing unit 801 is configured to determine, based on a maximum quantity of transmission times and/or a first timer, to release the first HARQ process. For example, the processing unit 801 may be configured to support the communications apparatus 80 in performing step 702.

The processing unit 801 may maintain, with reference to the first implementation to the fourth implementation in the method embodiments, a first timer associated with the first HARQ. Details are not described again.

Specifically, all related content of the steps in the method embodiment shown in FIG. 4, FIG. 5, or FIG. 7 may be cited in function descriptions of corresponding functional modules. Details are not described herein again. The communications apparatus 80 is configured to perform a function of a first terminal apparatus in the HARQ process control method shown in FIG. 4, FIG. 5, or FIG. 7. Therefore, the communications apparatus 80 can achieve an effect the same as that of the HARQ process control method.

In still another implementation, the communications apparatus 80 shown in FIG. 8 may further include a storage module, configured to store program code and data of the communications apparatus 80. The processing module 801 may be a processor or a controller. The processing unit 801 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The sending unit may be a transceiver circuit, a communications interface, or the like. The storage module may be a memory: When the processing unit 801 is the processor 301, the sending unit 802 is the transceiver circuit 302, and the storage module is the memory 304, the communications apparatus 80 in this embodiment of this application may be the apparatus 300 shown in FIG. 3.

Figure 9:
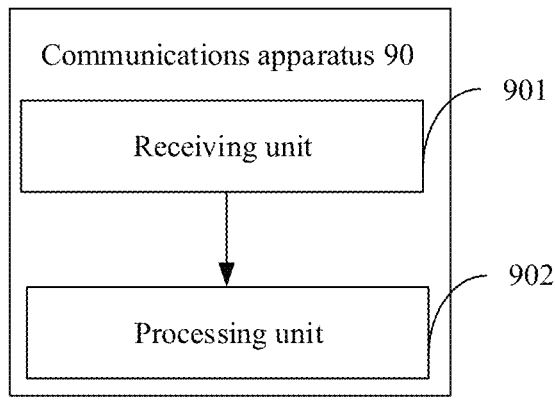
FIG. 9 is a schematic diagram of a composition of a communications apparatus 90 according to an embodiment of this application.

FIG. 9 is a diagram of a structure of a communications apparatus 90. The communications apparatus 90 may be a second terminal apparatus, a chip in the second terminal apparatus, or a system on chip. The communications apparatus 90 may be configured to perform a function of a terminal in the foregoing embodiments. The communications apparatus 90 shown in FIG. 9 may include a receiving unit 901 and a processing unit 902.

In an example, the receiving unit 901 is configured to receive first indication information from a first terminal apparatus. The first indication information is used to indicate that a transport block TB transmitted in a first HARQ process is a first TB transmitted for the last time or a newly transmitted TB: or is used to indicate that a quantity of times of transmitting a first TB in a first HARQ process reaches a maximum quantity of transmission times. For example, the receiving unit 901 is configured to support the communications apparatus 90 in performing step 403.

The processing unit 902 is configured to stop a second timer based on the first indication information. The second timer is associated with a second HARQ process, and the second HARQ process is associated with the first HARQ process. For example, the processing unit 902 is configured to support the communications apparatus 90 in performing step 403.

In another example, the processing unit 902 is configured to: determine that a quantity of times of feeding back a negative acknowledgment NACK to a first terminal apparatus exceeds M times, and stop a second timer. For example, the processing unit 902 is configured to support the communications apparatus 90 in performing step 505.

In still another example, the processing unit 902 is configured to: when a first transport block TB that corresponds to a transmission in a second HARQ process and that is transmitted by a first terminal apparatus is successfully decoded: or an acknowledgment ACK corresponding to a first TB is sent to a first terminal apparatus: or an acknowledgment ACK to be sent to a first terminal apparatus is generated: or a new transmission indication from a first terminal apparatus is received: or a distance between a second terminal apparatus and a first terminal apparatus is greater than a preset distance, clear a buffer associated with the second HARQ process, stop receiving the first TB in the second HARQ process, and further, receive the second TB in the second HARQ process. For example, the processing unit 902 is configured to support the communications apparatus 90 in performing step 601 and step 602.

The processing unit 902 may maintain, with reference to the fifth implementation to the eighth implementation in the method embodiments, a second timer associated with the second HARQ. Details are not described again.

Specifically, all related content of the steps in the method embodiment shown in FIG. 4, FIG. 5, or FIG. 6 may be cited in function descriptions of corresponding functional modules. Details are not described herein again. The communications apparatus 90 is configured to perform a function of a second terminal apparatus in the HARQ process control method shown in FIG. 4, FIG. 5, or FIG. 6. Therefore, the communications apparatus 90 can achieve an effect the same as that of the HARQ process control method.

In still another implementation, the communications apparatus 90 shown in FIG. 9 may further include a storage module, configured to store program code and data of the communications apparatus 90. The processing module 902 may be a processor or a controller. The processing unit 902 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The sending unit 901 may be a transceiver circuit, a communications interface, or the like. The storage module may be a memory: When the processing unit 902 is the processor 301, the sending unit 901 is the transceiver circuit 302, and the storage module is the memory 304, the communications apparatus 90 in this embodiment of this application may be the apparatus 300 shown in FIG. 3.

Figure 10:
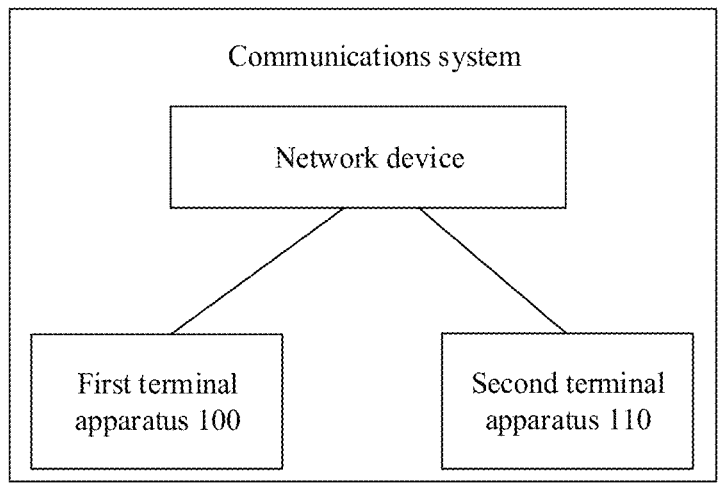
FIG. 10 is a schematic diagram of a composition of a communications system according to an embodiment of this application.

FIG. 10 is a diagram of a structure of a communications system according to an embodiment of this application. As shown in FIG. 10, the communications system may include a first terminal apparatus 100 and a second terminal apparatus 110. Further, the communications system may include a network device.

The first terminal apparatus 100 has a function of the communications apparatus 80 shown in FIG. 8. The second terminal apparatus 110 has a function of the communications apparatus 90 shown in FIG. 9.

In an example, the first terminal apparatus 100 is configured to: determine that a TB transmitted in a first HARQ process is a first TB transmitted for the last time or a newly transmitted TB, or when a quantity of times of transmitting a first TB in a first HARQ process reaches a maximum quantity of transmission times, stop a first timer, and send first indication information to the second terminal apparatus 110, where the first indication information is used to indicate that a transport block TB transmitted in the first HARQ process is a first TB transmitted for the last time or a newly transmitted TB, or is used to indicate that the quantity of times of transmitting the first TB in the first HARQ process reaches the maximum quantity of transmission times.

The second terminal apparatus 110 is configured to stop a second timer based on the first indication information.

In another example, the first terminal apparatus 100 is configured to stop the first timer when a quantity of NACKs corresponding to the first TB is equal to or exceeds M. The second terminal apparatus 110 stops the second timer when the quantity of NACKs corresponding to the first TB is equal to or exceeds M.

In still another example, the first terminal apparatus 100 is configured to determine, based on a maximum quantity of transmission times and/or a first timer, to release the first HARQ process.

In still another example, the second terminal apparatus 110 is configured to: when a first transport block TB that corresponds to transmission in a second HARQ process and that is transmitted by the first terminal apparatus 100 is successfully decoded: or an acknowledgment ACK corresponding to a first TB is sent to the first terminal apparatus 100: or an acknowledgment ACK is sent to the first terminal apparatus 100; or a new transmission indication from the first terminal apparatus 100 is received: or a distance between the second terminal apparatus 110 and the first terminal apparatus 100 is greater than a preset distance, clear a buffer associated with the second HARQ process, and stop receiving the first TB in the second HARQ process.

Specifically; all related content of the steps in the method embodiments shown in FIG. 4 to FIG. 7 may be cited in function descriptions of functional modules of the first terminal apparatus 100 and the second terminal apparatus 110. Details are not described herein again. The first terminal apparatus 100 and the second terminal apparatus 110 may be configured to perform functions of the second terminal apparatus in the HARQ process control methods shown in FIG. 4 to FIG. 7. Therefore, an effect the same as that of the HARQ process control method can be achieved.

An embodiment of this application further provides a computer-readable storage medium. All or some of the procedures in the foregoing method embodiments may be completed by a computer program instructing related hardware. The program may be stored in the foregoing computer storage medium. When the program is executed, the procedures of the foregoing method embodiments may be included. The computer-readable storage medium may be an internal storage unit of the terminal apparatus (including a data transmit end and/or a data receive end) in any one of the foregoing embodiments, for example, a hard disk or a memory of the terminal apparatus. Alternatively, the computer-readable storage medium may be an external storage device of the terminal apparatus, for example, a plug-in hard disk, a smart media card (SMC), a secure digital (SD) card, a flash card, or the like that are configured on the terminal apparatus. Further, the computer-readable storage medium may include both an internal storage unit and an external storage device of the terminal apparatus. The computer-readable storage medium is configured to store the computer program and other programs and data that are required by the terminal apparatus. The computer-readable storage medium may be further configured to temporarily store data that has been output or is to be output.

It should be noted that, in the specification, claims, and accompanying drawings of this application, terms "first", "second", and the like are intended to distinguish between different objects but do not indicate a particular order. In addition, the terms "including", "having", and any other variant thereof are intended to cover non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

It should be understood that in this application, "at least one (item)" means one or more, "a plurality of" means two or more, and "at least two (items)" means two, three, or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" usually indicates an "or" relationship between the associated objects. "At least one of the following items" or a similar expression thereof indicates any combination of these items, including a single item or any combination of a plurality of items. For example, at least one of a, b, or c may represent: a, b, c, "a and b", "a and c", "b and c", or "a, b, and c", where a, b, and c may be singular or plural.

It should be understood that in embodiments of this application, "B corresponding to A" indicates that B is associated with A. For example, B may be determined based on A. However, it should further be understood that determining B based on A does not mean that B is determined based only on A. B may also be alternatively determined based on A and/or other information. In 30) embodiments of this application, "connection" means various connection manners such as a direct connection or an indirect connection, for implementing communication between devices. This is not limited in embodiments of this application.

Unless otherwise specified, "transmission" (transmit) in embodiments of this application refers to bidirectional transmission, and includes a sending action and/or a receiving action. Specifically, "transmission" in embodiments of this application includes data sending, data receiving, or data sending and receiving. That is, data transmission herein includes uplink data transmission and/or downlink data transmission. Data may include a channel and/or a signal. The uplink data transmission is uplink channel transmission and/or uplink signal transmission, and the downlink data transmission is downlink channel transmission and/or downlink signal transmission. In embodiments of this application, a "network" and a "system" express a same concept, and a communications system is a communications network.

The foregoing descriptions about implementations allow a person skilled in the art to understand that, for the purpose of convenient and brief description, division into the foregoing functional modules is used as an example for illustration. In actual application, the foregoing functions can be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

Alternatively, the units may be distributed in a plurality of different places. Alternatively, the units may be distributed in a plurality of different places. Some or all of the units may be selected based on actual requirements to achieve the objectives of the solutions in the embodiments. Alternatively, the units may be distributed in a plurality of different places. Some or all of the units may be selected based on actual requirements to achieve the objectives of the solutions in the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in embodiments of this application. The foregoing storage medium includes any medium that can store program code, such as a USB flash drive, a removable hard disk, a ROM, a RAM, a magnetic disk, or an optical disc.

The foregoing description is merely a specific implementation of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A hybrid automatic repeat request (HARQ) process control method, comprising:
    receiving, by a first terminal, first sidelink control information (SCI) from a second terminal, wherein the first SCI is used to schedule a first transport block (TB), and the first SCI comprises information used to indicate a first HARQ process identifier (ID);
    receiving, by the first terminal, the first TB from the second terminal in a first HARQ process;
    receiving, by the first terminal, second SCI from the second terminal, wherein the second SCI is used to schedule a second TB, the second SCI comprises the information used to indicate the first HARQ process ID and indication information, and the indication information indicates that the second TB is a newly transmitted TB; and
    in response to the second SCI, clearing, by the first terminal, a buffer associated with the first HARQ process and releasing the first HARQ process.

2. The method according to claim 1, further comprising:
    storing, by the first terminal, an association relationship between the first HARQ process ID and the first HARQ process.

3. The method according to claim 1, wherein before receiving, by the first terminal, the first TB from the second terminal in the first HARQ process, the method further comprises:
    selecting, by the first terminal, one idle HARQ process from at least one maintained HARQ process as the first HARQ process.

4. The method according to claim 1, further comprising:
    selecting, by the first terminal, one idle HARQ process from at least one maintained HARQ process to receive the second TB.

5. A communication device, comprising:
    at least one processor, and
    one or more memories coupled to the at least one processor and storing programming instructions for execution by the at least one processor to perform operations comprising:
    receiving first sidelink control information (SCI) from a first terminal, wherein the first SCI is used to schedule a first transport block (TB), and the first SCI comprises information used to indicate a first HARQ process identifier (ID);
    receiving the first TB from the first terminal in a first HARQ process;
    receiving second SCI from the first terminal, wherein the second SCI is used to schedule a second TB, the second SCI comprises the information used to indicate the first HARQ process ID and indication information, and the indication information indicates that the second TB is a newly transmitted TB; and
    in response to the second SCI, clearing a buffer associated with the first HARQ process and releasing the first HARQ process.

6. The device according to claim 5, wherein the operations further comprise:
    storing an association relationship between the first HARQ process ID and the first HARQ process.

7. The device according to claim 5, wherein before receiving the first TB from the first terminal in the first HARQ process, the operations further comprise:

selecting one idle HARQ process from at least one maintained HARQ process as the first HARQ process.

8. The device according to claim 5, wherein the operations further comprise:
selecting one idle HARQ process from at least one maintained HARQ process to receive the second TB.

9. A non-transitory computer-readable medium having stored computer programs, the computer programs being executable by one or more processors, and when executed, causes the one or more processors to:
receive first sidelink control information (SCI) from a first terminal, wherein the first SCI is used to schedule a first transport block (TB), and the first SCI comprises information used to indicate a first HARQ process identifier (ID);
receive the first TB from the first terminal in a first HARQ process;
receive second SCI from the first terminal, wherein the second SCI is used to schedule a second TB, the second SCI comprises the information used to indicate the first HARQ process ID and indication information, and the indication information indicates that the second TB is a newly transmitted TB; and
in response to the second SCI, clear a buffer associated with the first HARQ process and release the first HARQ process.

10. The non-transitory computer-readable medium according to claim 9, wherein the computer programs when executed by the one or more processors, further cause the one or more processors to:
store an association relationship between the first HARQ process ID and the first HARQ process.

11. The non-transitory computer-readable medium according to claim 9, wherein the computer programs, when executed, further cause the one or more processors to:
before receiving the first TB from the first terminal in the first HARQ process,
select one idle HARQ process from at least one maintained HARQ process as the first HARQ process.

12. The non-transitory computer-readable medium according to claim 9, wherein the computer programs when executed by the one or more processors, further cause the one or more processors to:
select one idle HARQ process from at least one maintained HARQ process to receive the second TB.

* * * * *